United States Patent
Ohsaki

(10) Patent No.: US 9,032,324 B2
(45) Date of Patent: May 12, 2015

(54) MOBILE INFORMATION TERMINAL AND METHOD FOR DISPLAYING ELECTRONIC CONTENT

(71) Applicant: Sony Computer Entertainment Inc., Tokyo (JP)

(72) Inventor: Tatsuya Ohsaki, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 211 days.

(21) Appl. No.: 13/655,603

(22) Filed: Oct. 19, 2012

(65) Prior Publication Data

US 2013/0106809 A1 May 2, 2013

(30) Foreign Application Priority Data

Oct. 31, 2011 (JP) .................................. 2011-239310

(51) Int. Cl.
| | |
|---|---|
| *G06F 3/0483* | (2013.01) |
| *G06F 1/16* | (2006.01) |
| *G06F 3/0488* | (2013.01) |
| *G06F 3/0346* | (2013.01) |

(52) U.S. Cl.
CPC ............ *G06F 3/0483* (2013.01); *G06F 1/1694* (2013.01); *G06F 3/04883* (2013.01); *G06F 3/0346* (2013.01)

(58) Field of Classification Search
CPC . G06F 1/1694; G06F 3/0346; G06F 3/04883; G06F 3/0483
See application file for complete search history.

(56) References Cited

U.S. PATENT DOCUMENTS

2011/0296334 A1* 12/2011 Ryu et al. ...................... 715/776
2012/0124505 A1*  5/2012 St. Jacques, Jr. .............. 715/776

* cited by examiner

*Primary Examiner* — Srilakshmi K Kumar
*Assistant Examiner* — Krishna Neupane
(74) *Attorney, Agent, or Firm* — Katten Muchin Rosenman LLP

(57) ABSTRACT

A mobile information terminal includes a main information display control unit for displaying the information described on a specific page of electronic content presented to a user over a plurality of pages, a fore-edge display control unit for displaying an image of trimmed edges of the plurality of pages, as a fore-edge image, when the mobile information terminal is turned at a predetermined angle or more from a standard bearing, and an operation detector for detecting a trace operation from the user on the fore-edge image. When the trace operation on the fore-edge image is detected, the main information display control unit sequentially switches and displays the information described in a plurality of pages specified by the trace operation.

11 Claims, 18 Drawing Sheets

MOBILE INFORMATION TERMINAL AND METHOD FOR DISPLAYING ELECTRONIC CONTENT

BACKGROUND OF THE INVENTION

1. Field of the Invention

The present invention relates to a data processing technology, and more particularly to mobile information terminals for displaying electronic content on a display and a method for displaying the electronic content.

2. Description of the Related Art

Electronic book readers capable of storing data on electronic books (e-books) and displaying the data are now finding wider use.

Electronic books, when they are to be read on such electronic reading terminals (digital reading terminals), have thus far required handling obviously different from that in reading books of paper medium. The handling has often been intuitively unfamiliar to users who have habituated themselves to reading books of paper medium. The present inventor has reached a realization that there is room for improving a user interface of electronic book (e-book) readers in such a way as to give a sense of familiarity to digital reading approximating paper book reading.

SUMMARY OF THE INVENTION

The present invention has been made from the aforementioned realization of the inventor's, and a main purpose thereof is to provide a user interface that gives a user a sense of affinity in the reading of electronic books approximating the reading of books of paper medium.

In order to resolve the above-described problems, a mobile information apparatus according to one embodiment of the present invention includes: a main information display control unit, for a display of the mobile information apparatus, configured to display information described on a specific page of electronic content presented to a user over a plurality of pages; a fore-edge display control unit configured to display an image of trimmed edges of a plurality of pages, as a fore-edge image, in a region different from the display of the information described on the specific page, when the mobile information terminal is tilted at a predetermined angle or more from a standard bearing; and an operation detector configured to detect a trace operation from the user on the fore-edge image. When the trace operation is detected on the fore-edge image, the main information display control unit sequentially switches information described on a plurality of pages specified by the trace operation so as to be displayed.

Another embodiment of the present invention relates also to a mobile information apparatus. The mobile information apparatus includes: a main information display control unit configured to display, on a display of the mobile information apparatus, information described on a specific page of electronic content presented to a user over a plurality of pages; a fore-edge display control unit configured to display an image of trimmed edges of a plurality of pages, as a fore-edge image, in a region different from the display of the information described on the specific page, when the mobile information terminal is tilted at a predetermined angle or more from a standard bearing; and an operation detector configured to detect a tap operation from the user on the fore-edge image. When the tap operation is detected at an arbitrary position of the fore-edge image, the main information display control unit displays information described on a page that is associated beforehand with the tap position.

Still another embodiment of the present invention relates also to a mobile information apparatus. The mobile information apparatus includes: a main information display control unit, for a display of the mobile information apparatus, configured to display information described on a specific page of electronic content presented to a user over a plurality of pages; a fore-edge display control unit configured to display an image of trimmed edges of a plurality of pages, as a fore-edge image, in a region different from the display of the information described on the specific page, when the mobile information terminal is tilted at a predetermined angle or more from a standard bearing; and an operation detector configured to detect a trace operation from the user on the fore-edge image. When the trace operation is detected on the fore-edge image, the main information display control unit sequentially switches and displays information described on each page, from sequentially earlier pages to sequentially later pages or in reverse.

Still another embodiment of the present invention relates to a method for display electronic content. The method includes: displaying, on a display of a mobile information apparatus, information described on a specific page of electronic content presented to a user over a plurality of pages; displaying an image of trimmed edges of a plurality of pages, as a fore-edge image, in a region different from the display of the information described on the specific page, when the mobile information terminal is tilted at a predetermined angle or more from a standard bearing; detecting a trace operation from the user on the fore-edge image; and sequentially switching and displaying information described on a plurality of pages specified by the trace operation on the fore-edge image.

Optional combinations of the aforementioned constituting elements, and implementations of the invention in the form of apparatuses, methods, systems, computer programs, recording media that store the programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Firstly, the present invention will be explained in outline. The user's handling of books of paper medium (hereinafter referred to as "paper books") in contrast to electronic or digital books may, for instance, have the following characteristics:

(a) The user holds a book at a tilt and turns a page using the fore-edge of the book.
(b) The user determines the volume of the book by looking at the thickness of the fore-edge.
(c) The user holds a book at a tilt and inserts a bookmark (tassel) in the top edge (head) for later reading or rereading.
(d) The user holds a book at a tilt and checks the title and other information on the book by looking at the front and back covers.

As understood by the inventor, the conventional digital reading terminals have problems as listed below, requiring the users, who have habituated themselves to reading paper books, to engage in unintuitive, and therefore uncomfortable, handling:

(a) A graphical user interface (GUI) component for switching a page is sometimes displayed on top of a text of a book, thus interfering with the reading of the electronic book.
(b) The page being displayed is numerically identified, which can hamper the intuitive grasp of where a user (who are reading the book) is in the whole book.
(c) Insertion of a bookmark cannot be done easily and intuitively.
(d) The title and the like of the e-book are sometimes displayed on top of the text being displayed (i.e., superimposed onto the body text of the e-book), thus hampering the reading of the text.

The mobile information terminal according to the embodiments of this invention, which detects its own bearing with sensors and the operations (handling) performed by the user on the touch panel, adjusts the mode of display of the e-book based on the detections in such a manner as to approximate the case with a paper book. This may give the user a sense of familiarity in the reading of an electronic book approximating the reading of a paper book.

Figure 1:
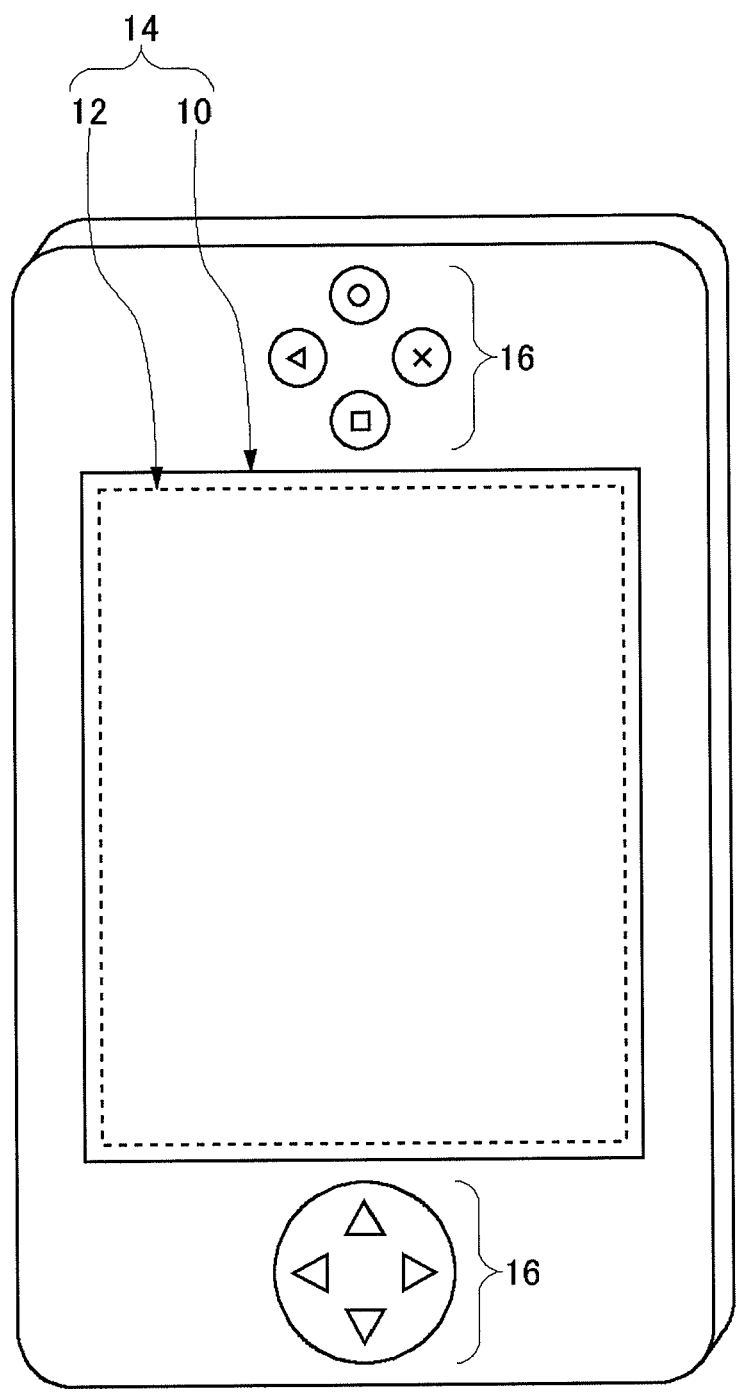
FIG. 1 shows an appearance of a mobile information terminal according to an embodiment.

FIG. 1 shows an appearance of a mobile information terminal 100 according to an embodiment. The mobile information terminal 100 is an information processing device that can be carried around by the user and assists the user in reading electronic books. The electronic books meant in this embodiment are digital books that can provide the users with information over a plurality of pages of those books. For example, the electronic books include electronic literary books, business books, comics, magazines, photo books, catalogs, leaflets, and the like. The mobile information terminal 100 may be any of devices specialized in the reading of e-books or any of general-purpose mobile game devices, mobile phones, smartphones, tablet information terminals, and the like.

The mobile information terminal 100 is provided with a touch panel 12 and a display 10, the touch panel 12 disposed over the entirety of the display 10. It is to be noted that the display 10 and the touch panel 12 may be constructed integrally together, and the display 10 and the touch panel 12 are collectively referred to as a "touch display 14". The mobile information terminal 100 is further provided with controllers 16, such as various control buttons and arrow keys, which are to be used by the user to operate the mobile information terminal 100. In this embodiment, however, the operations (handling) related to the reading of an electronic book are performed through the touch panel 12.

Figure 2:
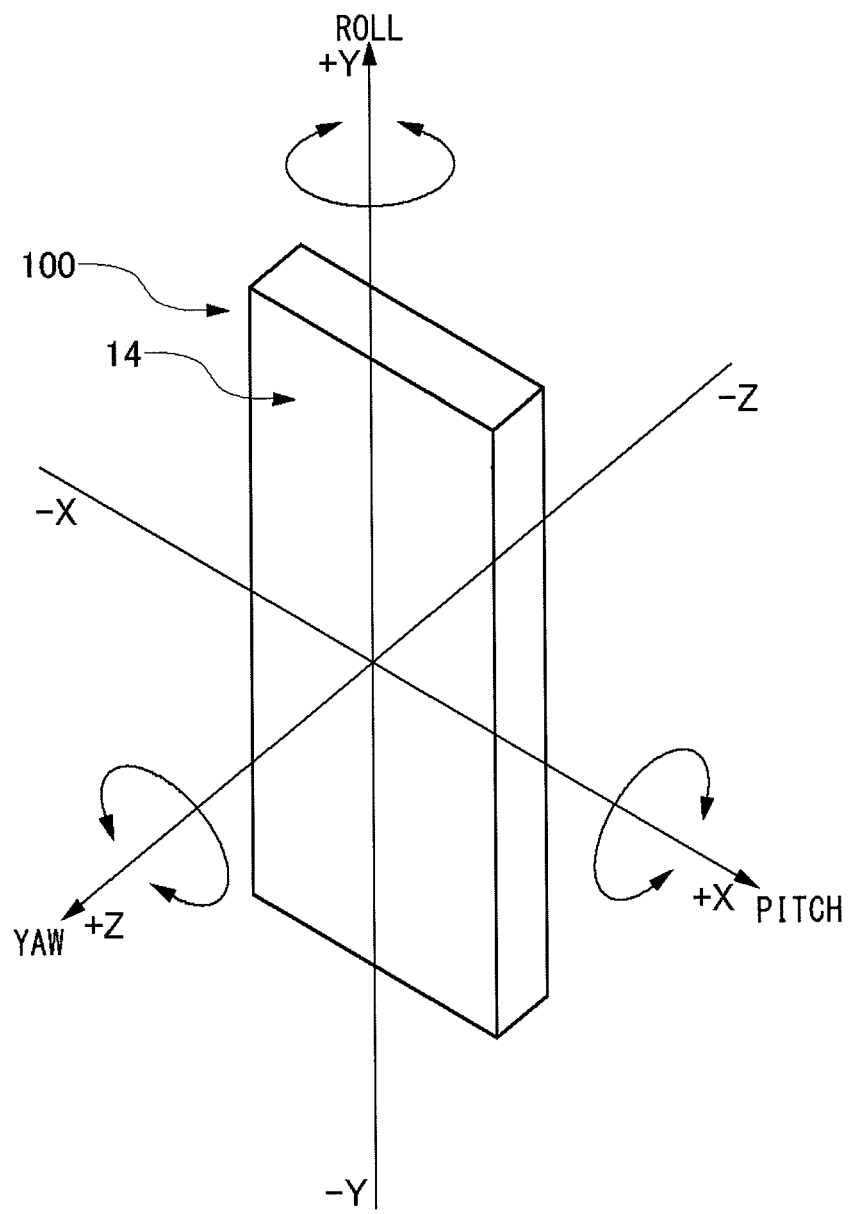
FIG. 2 is a diagram by which to define some terms used in explaining an embodiment.

FIG. 2 is a diagram by which to define some terms used in explaining this embodiment. Presented in the diagram are the definitions for explaining the bearing of the mobile information terminal 100, that is, the inclination of the mobile information terminal 100 in a three-dimensional space. The Y axis is the axis in a vertical direction. The Z axis, which is an axis perpendicular to the Y axis, is the axis in the direction where the user of the mobile information terminal 100 is located. Typically, the Z axis is also the axis that is along the line of sight of the user reading a digital book. The X axis is the axis perpendicular to both the Y axis and Z axis.

Hereinbelow, the angle formed by the mobile information terminal 100 with respect to the X axis in the X-Z plane is called a "roll angle". The angle formed by the mobile information terminal 100 with respect to the Z axis in the Y-Z plane is called a "pitch angle". And the angle formed by the mobile information terminal 100 with respect to the Y axis in the X-Y plane is called a "yaw angle". It is to be understood that the user is present in the +Z direction. Typically, therefore, when the user is reading an electronic book, the touch display 14 of the mobile information terminal 100 faces the user in the +Z direction.

Figure 3:
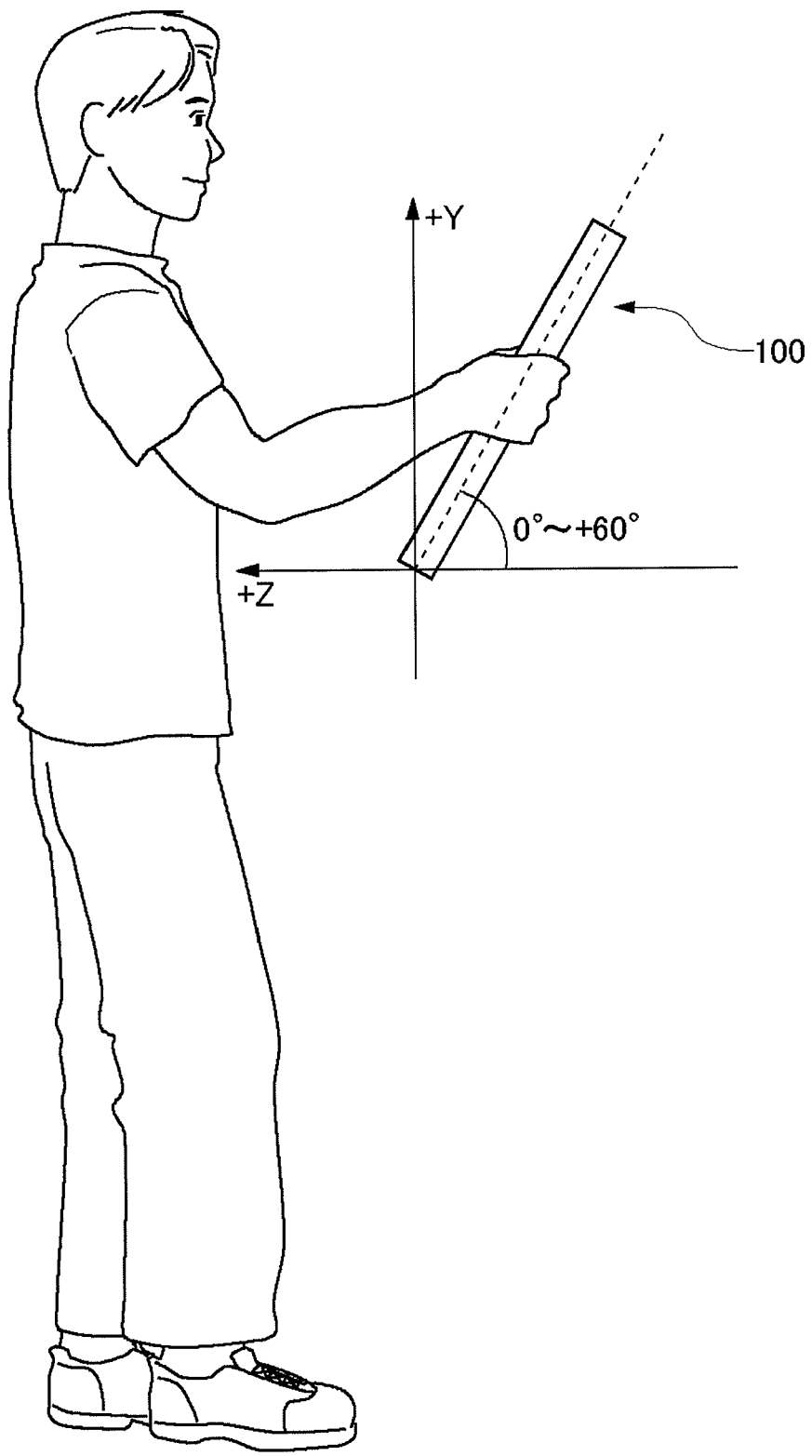
FIG. 3 illustrates a standard bearing of a mobile information terminal in an embodiment.

FIG. 3 illustrates a standard bearing of the mobile information terminal 100 in an embodiment. In this embodiment, it is assumed that the standard bearing of the mobile information terminal 100 is when the pitch angle is 0 to 60 degrees, the roll angle 0 degrees, and the yaw angle 0 degrees.

The mobile information terminal 100 has four display modes, which are switched as appropriate according to the change in the bearing of the terminal. The four display modes include "text display mode" (i.e., "body text of a book display mode"), "fore-edge display mode", "spine display mode", and "top-edge display mode (head display mode)". The individual display modes will be explained below.

Figure 4:
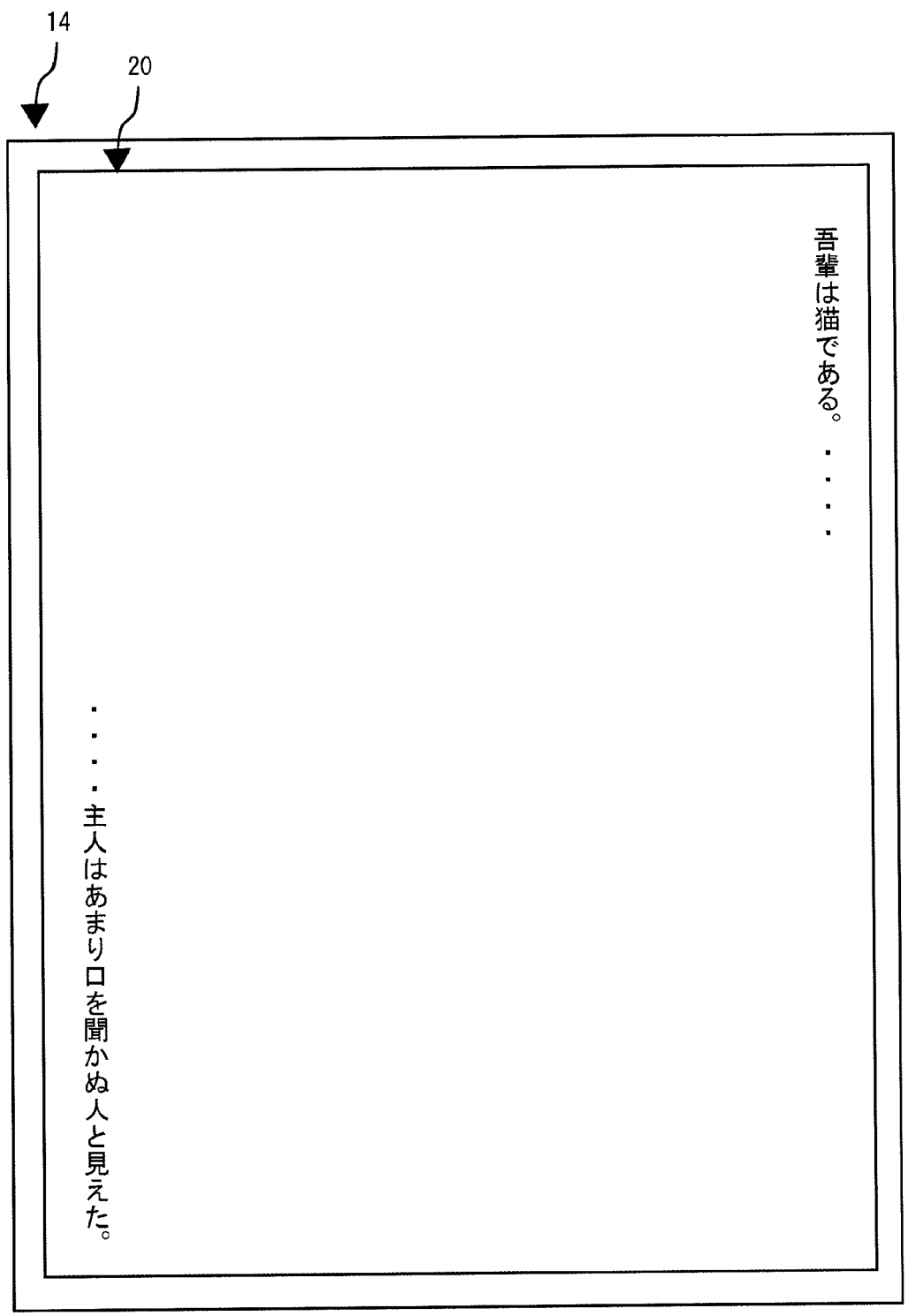
FIG. 4 shows a user interface in a text display mode.

FIG. 4 shows a user interface in the text display mode. In the text display mode, a text display region 20, which is the region for displaying the text data of an electronic book, namely, the descriptive content of each page of the book, or the work, is displayed on the entirety of the touch display 14. FIG. 4 illustrates a state of display in which an image representing a descriptive content of a specific page of the electronic book is being displayed in the text display region 20. FIG. 4, FIG. 6, FIG. 8, and FIG. 10 each illustrates an example where Japanese text written in vertical written mode is displayed in the text display region 20. In the present embodiment, the text display mode is set as the default mode when none of the fore-edge display mode, spine display mode, and top-edge display mode to be discussed later applies.

Also, for the mobile information terminal 100, the left side of a page is designated as the portion of the electronic book corresponding to the fore-edge of a paper book. Also, the right side of a page is designated as the portion of the electronic book corresponding to the spine (back cover) of a paper book.

Also, the upper side of a page is designated as the portion of the electronic book corresponding to the top-edge of a paper book.

Figure 5:
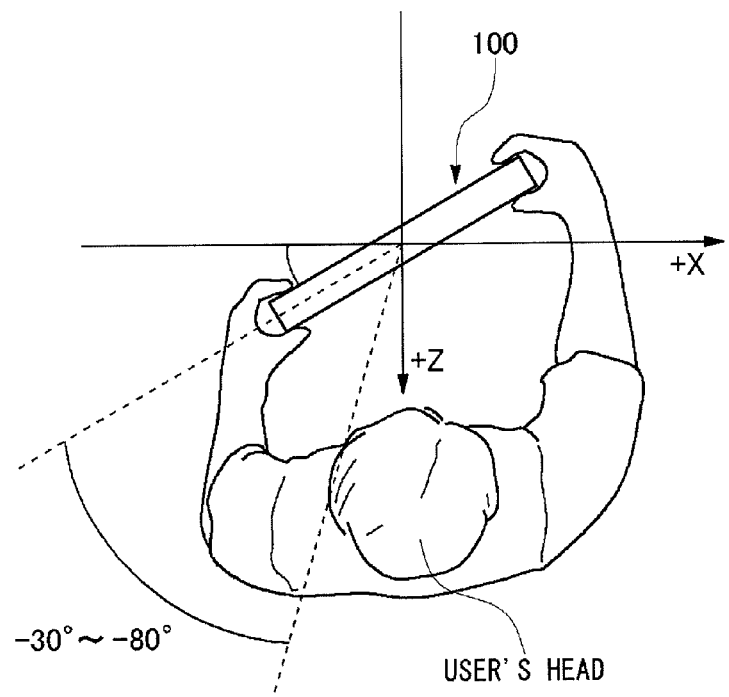
FIG. 5 illustrates a bearing of a mobile information terminal when it is in a fore-edge display mode.

FIG. 5 illustrates a bearing of the mobile information terminal 100 when it is in the fore-edge display mode. The mobile information terminal 100 goes into the fore-edge display mode when the roll angle enters the range of −30 to −80 degrees. In other words, a switch to the fore-edge display mode is made when the mobile information terminal 100 is turned by a predetermined angle or more from the standard bearing in the direction of the portion of the electronic book designated as corresponding to the fore-edge of a paper book (the left side of the mobile information terminal 100 in this case) approaching the user.

Figure 6:
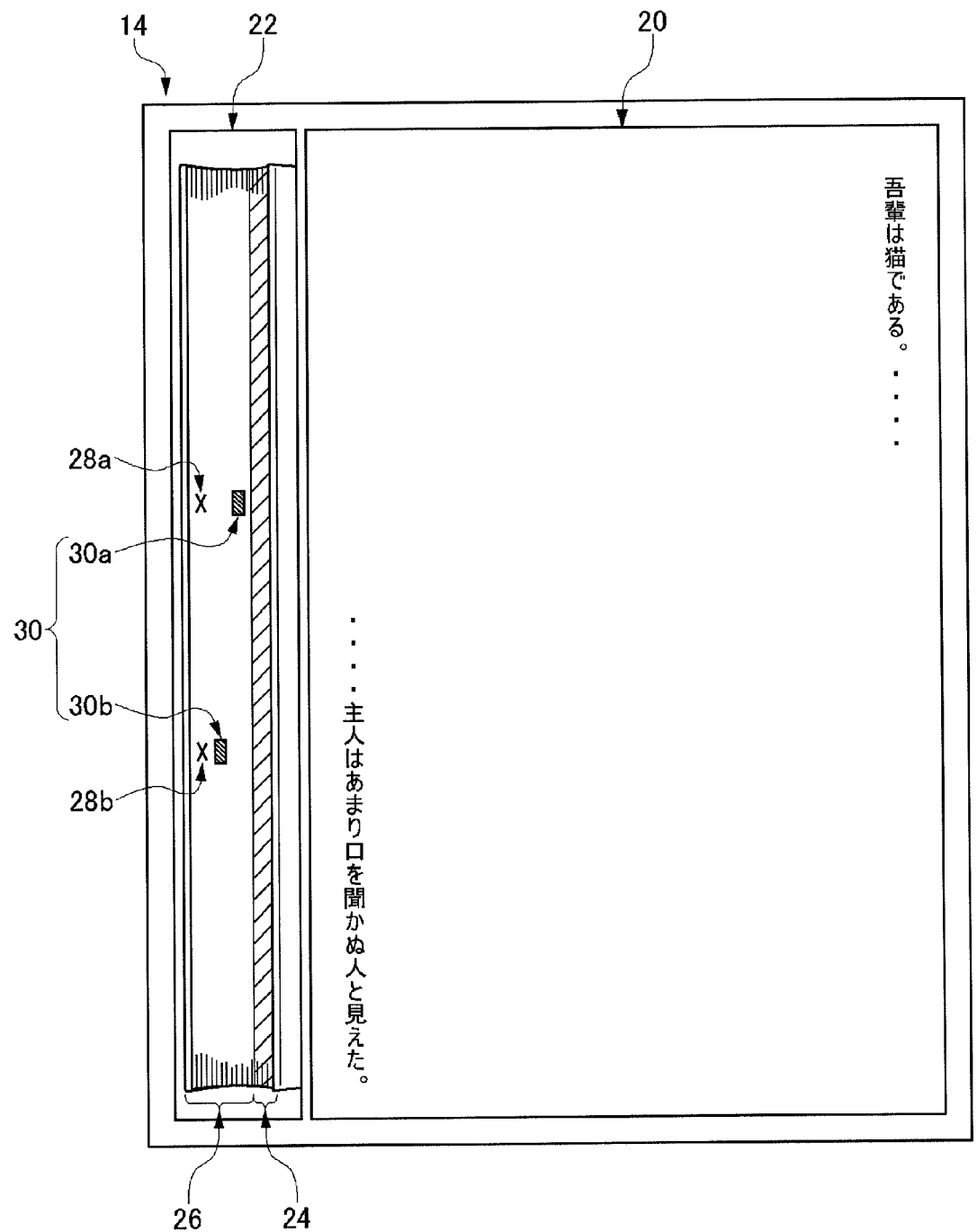
FIG. 6 shows a user interface in a fore-edge display mode.

FIG. 6 shows a user interface in the fore-edge display mode. In the fore-edge display mode, the text display region 20 becomes smaller in size than in the text display mode, and a fore-edge display region 22 is set on the left side of the text display region 20. Displayed in the fore-edge display region 22 is an image approximating the fore-edge of the paper book, that is, an image of trimmed edges of a plurality of pages of the paper book (hereinafter referred to as a "fore-edge image" also). In the display of a fore-edge image, a distinction is made between a read portion 24 and an unread portion 26, and the boundary between the read portion 24 and the unread portion 26 falls on the page the user is now reading.

Also, the positions in the vertical direction of a fore-edge image are associated with specific pages of the electronic book. More specifically, the relatively higher positions of the fore-edge image are associated with the relatively earlier pages of the electronic book, and the relatively lower positions thereof with the relatively later pages thereof. In other words, the lower the position in the fore-edge image, the later the page in the electronic book it is associated with. And the arrangement is such that if the user taps an arbitrary position of the fore-edge image, the content of display in the text display region 20 will switch to the content of the page corresponding to the tapped position.

Also, if the user traces (i.e., drags) the fore-edge image with a finger (hereinafter referred to as "tracing", "trace operation" or "act of tracing" also), the displayed content in the text display region 20 will change sequentially from the page corresponding to the start position of tracing to the page corresponding to the end position of tracing. In other words, all the pages from the page associated with the position of the fore-edge image initially touched with the finger in the tracing to the page associated with the position where the finger is finally removed from the fore-edge image are displayed in turn in the text display region 20. This function allows the flipping over of pages by the fore-edge while checking the content thereof.

Also displayed in the fore-edge image is a page guide 30 to indicate to the user a page specified by himself/herself. The page guide 30 indicates where in the whole book the page corresponding to the position the user touches is located. For example, a page guide 30a will be displayed when the user is touching a touching position 28a during a tracing, and a page guide 30b will be displayed when the user is touching a touching position 28b. Accordingly, the user can easily grasp where in the whole book the page specified in tapping or tracing is located.

The mobile information terminal 100 therefore can give the user a sense of familiarity in the reading of an electronic book approximating the reading of a paper book. For example, the user can have a fore-edge image displayed, in approximation of a paper book, by tilting the terminal to the right. Also, the user can jump to an arbitrary page by the act of tapping or have the display of a plurality of pages switched sequentially by the act of tracing. Also, the mobile information terminal 100 helps the user intuitively recognize the volume of an electronic book or the read portion and the unread portion thereof. Also, the fore-edge image, which is displayed in a region separate from the text of the book, does not interfere with the reading of the text. Also, the association of the vertical positions of the fore-edge image with the specific pages of the electronic book helps make the horizontal width of the fore-edge image relatively small. For example, the horizontal width wide enough to allow a single finger of the user to enter there will be sufficient. This will prevent the text display region 20 from getting too small and thus can balance the facility of tapping and tracing on the fore-edge image and the visibility of the text of the electronic book.

In the embodiments, the description is such that the tapping and tracing on the fore-edge image and other operations by the user on the touch display 14 in the other display modes are to be done with a finger of the user. However, it goes without saying that in modifications thereof, a stylus or other predetermined input devices may be used in the place of a finger of the user.

Figure 7:
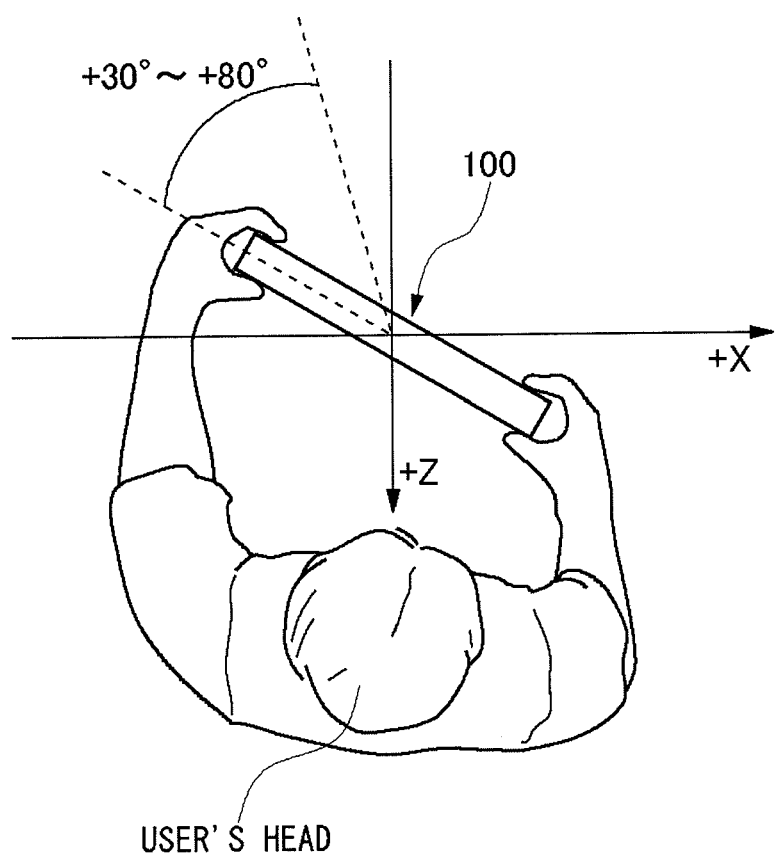
FIG. 7 illustrates a bearing of a mobile information terminal when it is in a spine display mode.

FIG. 7 illustrates a bearing of the mobile information terminal 100 when it is in the spine display mode. The mobile information terminal 100 goes into the spine display mode when the roll angle enters the range of +30 to +80 degrees. In other words, a switch to the spine display mode is made when the mobile information terminal 100 is turned by a predetermined angle or more from the standard bearing in the direction of the portion of the electronic book designated as corresponding to the spine of a paper book (the right side of the mobile information terminal 100 in this case) approaching the user. This direction may be said to be the direction opposite to the turning direction for the fore-edge display mode.

Figure 8:
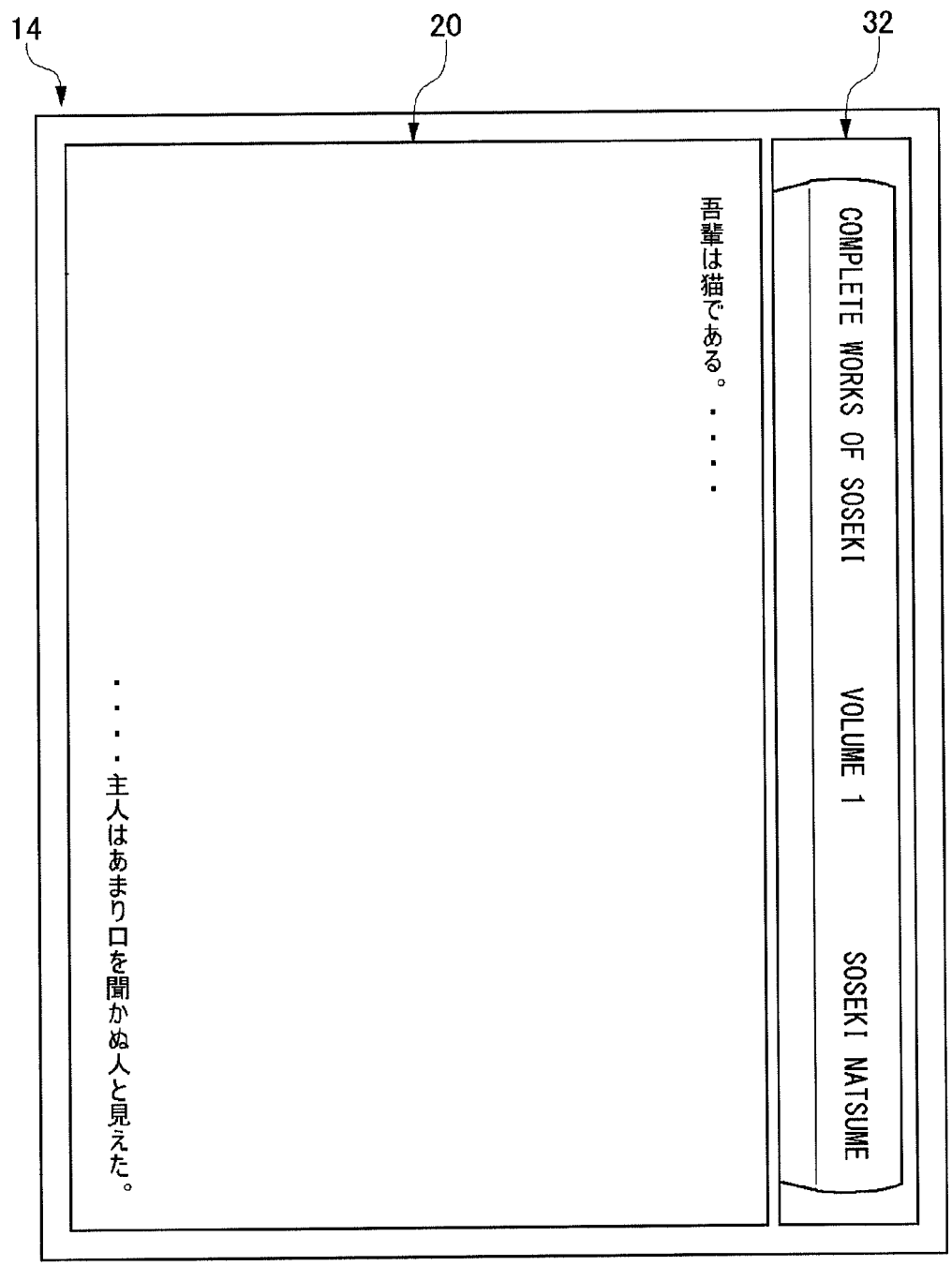
FIG. 8 shows a user interface in a spine display mode.

FIG. 8 shows a user interface in the spine display mode. In the spine display mode, the text display region 20 becomes smaller in size than in the text display mode, and a spine display region 32 is set on the right side of the text display region 20. Displayed in the spine display region 32 is an image approximating the spine of the paper book (hereinafter referred to as a "spine image" also). The spine image includes information concerning the electronic book now being displayed in the text display region 20, such as the title, volume number, and author name of the book.

The mobile information terminal 100 therefore can present to the user information on an electronic book by the display of the spine, in approximation of a paper book, with the user turning the terminal to the left. Also, the spine image, which is displayed in a region separate from the text of the book, does not interfere with the reading of the text.

Figure 9:
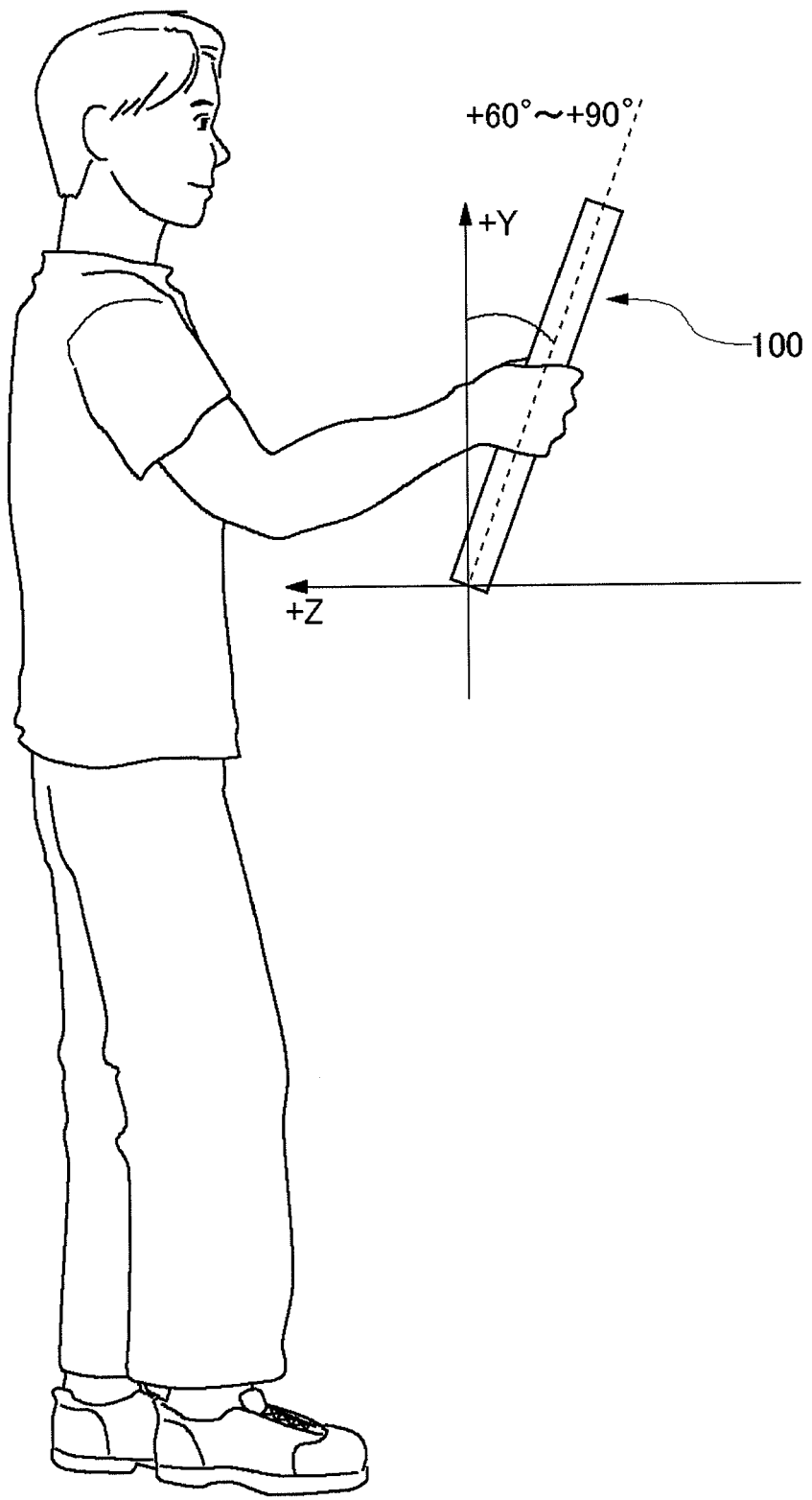
FIG. 9 illustrates a bearing of a mobile information terminal when it is in a top-edge display mode.

FIG. 9 illustrates a bearing of the mobile information terminal 100 when it is in the top-edge display mode. The mobile information terminal 100 goes into the top-edge display mode when the pitch angle enters the range of 60 degrees (exclusive) to 90 degrees. In other words, a switch to the top-edge display mode is made when the mobile information terminal 100 is tilted by a predetermined angle or more from the standard bearing in the direction of the portion of the electronic book designated as corresponding to the top-edge of a paper book (the upper side of the mobile information terminal 100 in this case) approaching the user.

Figure 10:
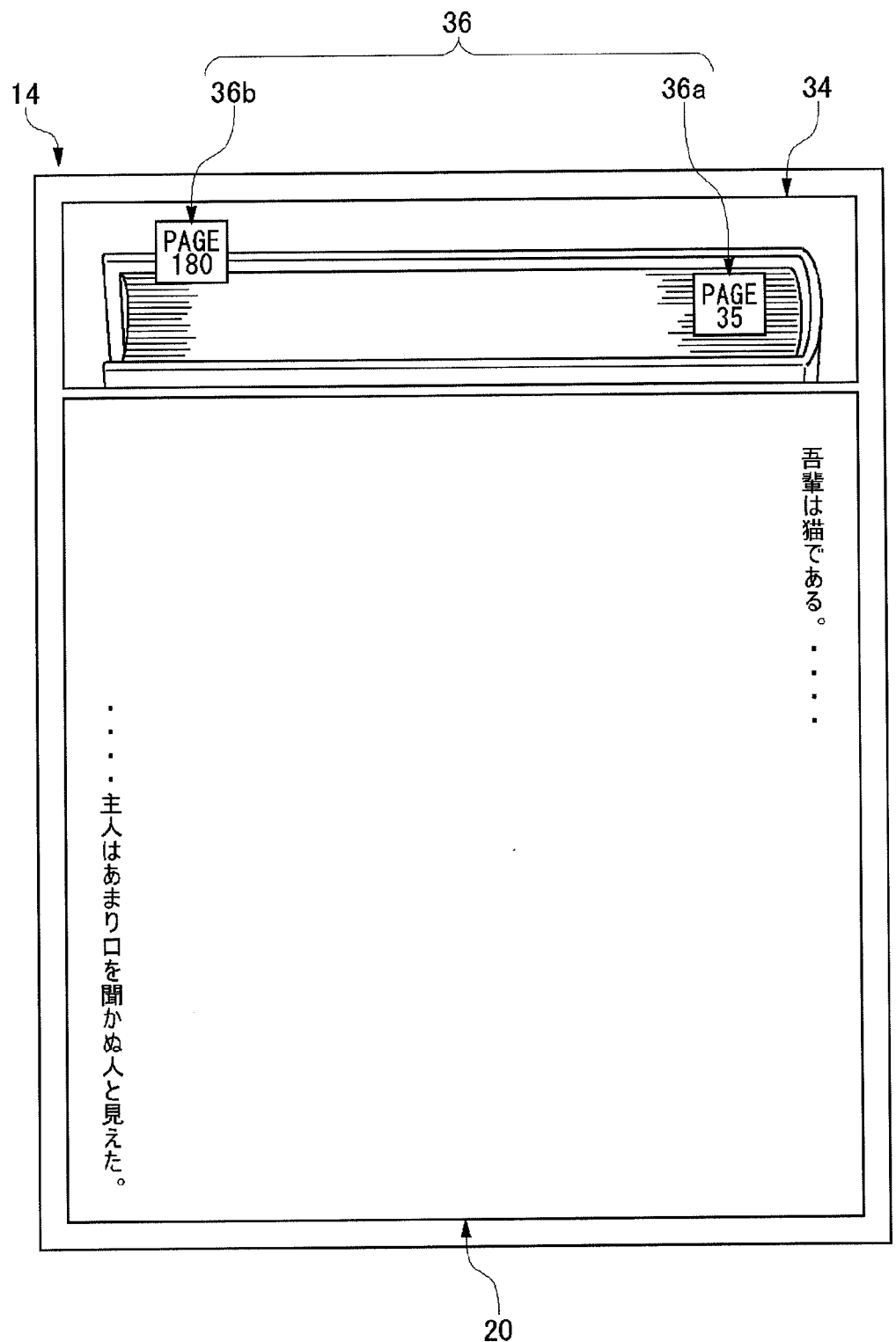
FIG. 10 shows a user interface in the top-edge display mode.

FIG. 10 shows a user interface in the top-edge display mode. In the top-edge display mode, the text display region 20 becomes smaller in size than in the text display mode, and a top-edge display region 34 is set on the upper side of the text display region 20. Displayed in the top-edge display region 34 is an image approximating the head of the paper book (hereinafter referred to as a "top-edge image" also).

Bookmark objects 36 indicating bookmarks set by the user are additionally displayed in the top-edge image. Shown in the top-edge image of FIG. 10 are a bookmark object 36a set to page 35 and a bookmark object 36b set to page 180. As a user taps on the bookmark object 36a, an object to be displayed in the text display region 20 is switched to content of page 35. As the user taps on the bookmark object 36b, an object to be displayed in the text display region 20 is switched to content of page 180. With a trace (i.e., drag) operation on the top-edge image by the user, a new bookmark is set to a page to be displayed in the then text display region 20.

The mobile information terminal 100 therefore displays the top-edge image in approximation of a paper book if the user tilts the terminal to an almost upright (vertical) position, namely if the user tilts the terminal in the direction of the top-edge of a paper book approaching the user. The user can move the page by selecting the bookmark that has already been inserted. Also, the user can set a new bookmark to the page that the user is reading.

Figure 11:
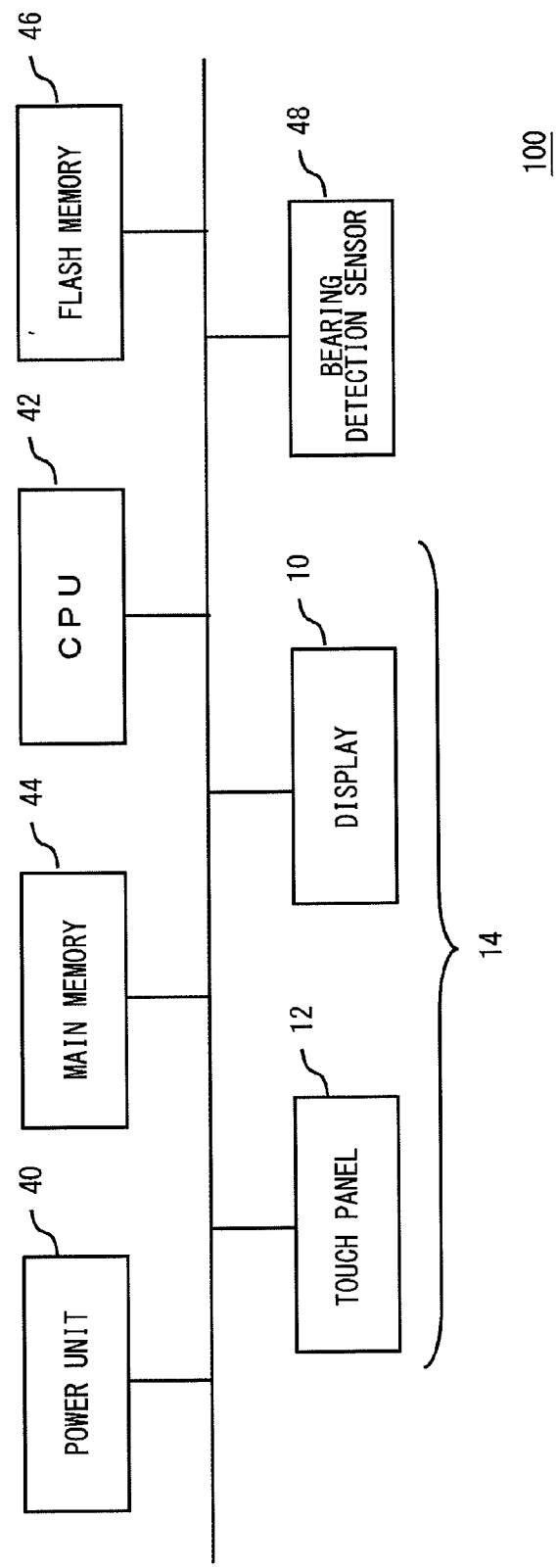
FIG. 11 shows a hardware configuration of a mobile information terminal.

FIG. 11 shows a hardware configuration of the mobile information terminal 100. The mobile information terminal 100 includes a display 10 and a touch panel 12, which are genetically referred to as "touch display panel 14", a power unit 40, a central processing unit (CPU) 42, a main memory 44, a flash memory 46, and a bearing detection sensor 48. All of these devices are directly or indirectly connected to each other via a bus.

The flash memory 46 stores an operating system (OS), various types of drive software, and a digital book viewing application. The CPU 42 not only controls the entire mobile information terminal 100 by the OS stored in the flash memory 46 in a unified manner but also executes display processing of an electronic book based on the viewing application. The CPU 42 may include a graphics processing unit (GPU) specialized in processing graphics such as a product-sum operation. The main memory 44 is a temporary storage area for a program module executed in the CPU 42 and is also utilized as a working area where the data processed by the CPU 42 is temporarily stored. The main memory 44 is constituted by a random access memory (RAM) or the like. The power unit 40, which is provided with an AC adapter or rechargeable battery, supplies power to each device under the control of the CPU 42.

The display 10 displays various types of information according to the control of the CPU 42. More specifically, the data of an electronic book specified by the CPU 42 is converted into video signals and then various types of information in response to the video signals is displayed on a screen. The display 10 may be a liquid crystal display or an organic EL (electroluminescent) display. The touch panel 12, which is comprised of a not-shown coordinate detection device, detects a tap position tapped with a user's finger and a trace position traced with a user's finger (in other words, trajectory points of drag operation). And then the touch panel 12 conveys the coordinate information indicating the tap position and the trance position (trajectory points) to the CPU 42.

The bearing detection sensor 48, which includes an acceleration sensor, detects the bearing of the mobile information terminal 100 in three axes as shown in FIG. 2 (e.g., a turning direction and orientation). And then the bearing detection sensor 48 conveys the information indicating the bearing of the mobile information terminal 100 to the CPU 42. Known art may be used for the detection of the bearing of the mobile information terminal 100. The bearing detection sensor 48 may further include other types of sensors such as a gyro sensor to further enhance the degree of accuracy in detecting the bearing of the mobile information terminal 100.

Figure 12:
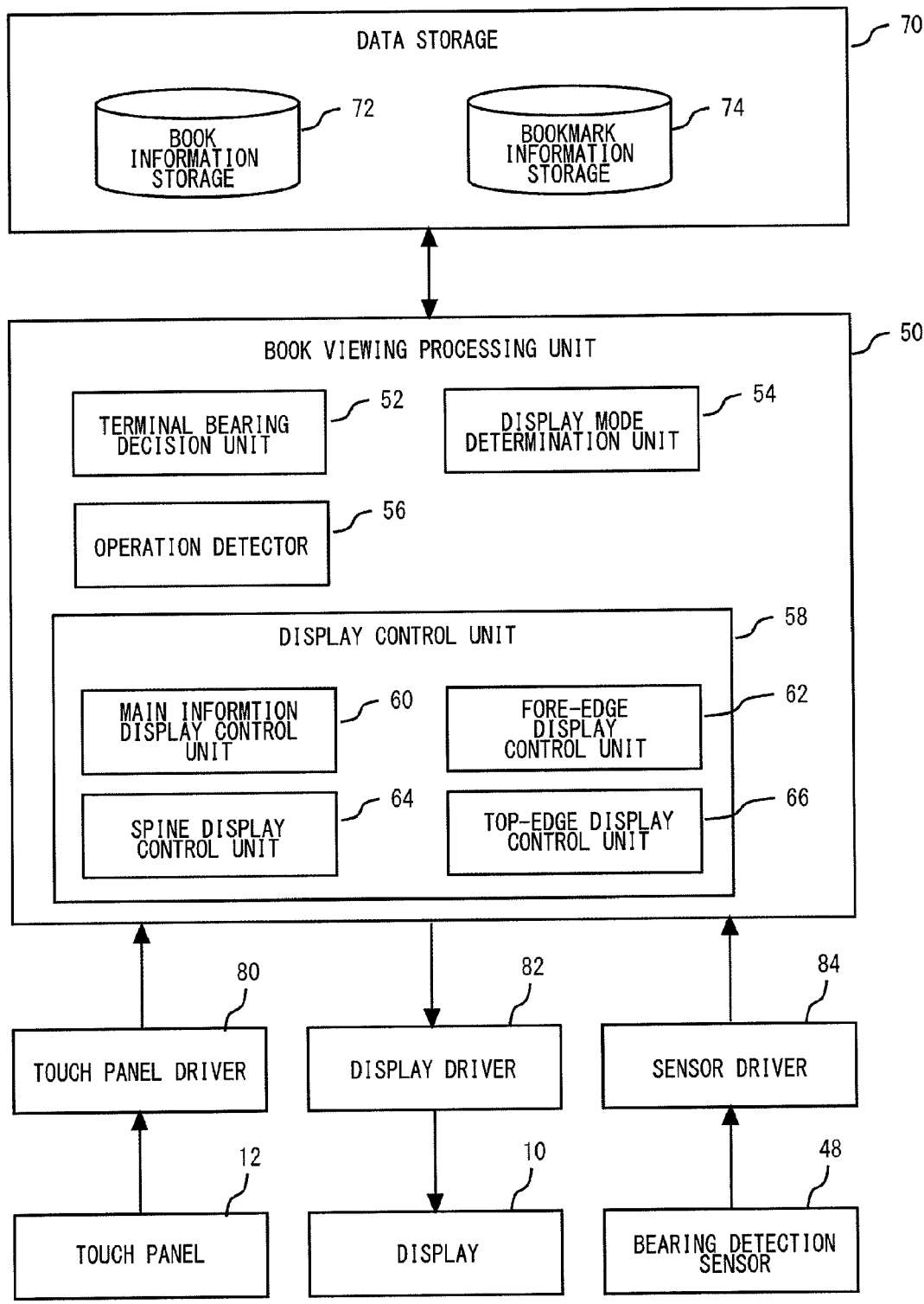
FIG. 12 is a block diagram showing a functional structure of a mobile information terminal.

FIG. 12 is a block diagram showing a functional structure of a mobile information terminal 100. The mobile information terminal 100 includes a display 10, a touch panel 12, a bearing detection sensor 48, a book viewing processing unit 50, a data storage 70, a touch panel driver 80, a display driver 82, and a sensor driver 84.

Each block shown in the block diagrams of the present patent specification may be achieved hardwarewise by elements and mechanical devices such as a CPU, memory, and the like of a computer, and softwarewise by computer programs and the like. Depicted herein are functional blocks implemented by cooperation of hardware and software. Therefore, it will be obvious to those skilled in the art that the functional blocks may be implemented by a variety of manners including hardware only, software only or a combination of both. In the present embodiment, the book viewing processing unit 50 is stored in the flash memory 46 as the digital book viewing application, and a program module associated with each functional block is read to the main memory 44 as appropriate and is then executed by the CPU 42. Also, a data storage 70 may be achieved by the flash memory 46 and the main memory 44.

The touch panel driver 80, the display driver 82, and the sensor driver 84 are driver software for mediating interaction between the touch panel 12, the display 10, and the bearing detection sensor 48, respectively, which are hardware, and the book viewing processing unit 50.

The data storage 70 includes a book information storage 72 and a bookmark information storage 74. The book information storage 72 stores the ID of an electronic book, text data (e.g., character data description on each of a plurality of pages), information on the book other than the text (e.g., the title of the book, volume number, author name), and the total number of pages of the electronic book by associating them each other. Each item of data to be stored in the book information storage 72 may be typically stored when the data on an electronic book is downloaded through the Internet and installed in the mobile information terminal 100. In the present embodiments, however, it is assumed that such data are stored in the book information storage 72 in advance. The bookmark information storage 74 stores the ID of a bookmark, the ID of the electronic book setting the bookmark, the coordinate information indicating the setting position in the top edge image, and the page number where the bookmark is set by associating them each other.

The book viewing processing unit 50 includes a terminal bearing decision unit 52, a display mode determination unit 54, an operation detector 56, and a display control unit 58. The terminal bearing decision unit 52 stores the information indicating the bearing of the mobile information terminal 100 inputted from the bearing detection sensor 48 via the sensor driver 84 successively in the main memory 44. Then, based on the information, the terminal bearing decision unit 52 decides the bearing of the mobile information terminal 100 in a three-dimensional space formed by the X axis, Y axis, and Z axis of FIG. 2. For example, the terminal bearing decision unit 52 decides the pitch angle, the roll angle, and the yaw angle by calculating the angle of the mobile information terminal 100 with respect to the direction of gravitational force working thereon.

The display mode determination unit 54 determines the display mode for the electronic book based on the bearing of the mobile information terminal 100 decided by the terminal bearing decision unit 52. More specifically, the display mode determination unit 54 determines the fore-edge display mode when the roll angle is in the range of −30 to −80 degrees, the spine display mode when the roll angle is in the range of +30 to +80 degrees, or the top-edge display mode when the pitch angle is in the range of 60 to 90 degrees. The display mode determination unit 54 determines the text display mode when the bearing of the mobile information terminal 100 is other than the above.

The operation detector 56 detects the user's operation on the touch panel 12 based on the coordinate information inputted from the touch panel 12 via the touch panel driver 80. For example, in the fore-edge display mode, the operation detector 56 stores in the main memory 44 the information indicating which of tapping and tracing has been the user's operation on the fore-edge image. Also, the operation detection unit 56 detects the tapping position in the case of tapping or the start position, the intermediate positions, and the end position in the case of tracing and stores them in the main memory 44. Also, in the top edge display mode, the operation detector 56 stores in the memory 44 the information indicating the bookmark tapped by the user in the selection on the top-edge image. Also, the operation detector 56 stores in the main memory 44 the information indicating the position of tracing by the user in the insertion on the top-edge image.

The display control unit 58 controls the mode of display of the electronic book on the display 10 according to the display mode decided by the display mode decision unit 54 and the operation on the touch panel 12 detected by the operation detector 56. The display control unit 58 includes a main information display control unit 60, a fore-edge display control unit 62, a spine display control unit 64, and a top-edge display control unit 66.

The main information display control unit 60 sets the text display region 20 on the display 10 and has the text of each page of the electronic book displayed in the text display region 20. In the text display mode, the main information display control unit 60 sets the text display region 20 on the entirety (full screen) of the display 10. On the other hand, in the fore-edge display mode, the spine display mode, or the top-edge display mode, the main information display control unit 60 sets the text display region 20 smaller than that in the text display mode.

In the fore-edge display mode, the fore-edge display control unit 62 sets the fore-edge display region 22 on the left of the text display region 20 in such a manner that the fore-edge display region 22 does not overlap the text display region 20 reduced in size and causes a display of the fore-edge image in the fore-edge display region 22. The fore-edge display control unit 62 adjusts the thickness of the entire fore-edge image according to the total number of pages of the electronic book stored in the book information storage 72. In other words, the larger the total number of pages of the electronic book, the more the trimmed edges of pages the fore-edge image will show, that is, the thicker the fore-edge image will be.

Also, the fore-edge display control unit 62 sets the boundary between the read portion 24 and the unread portion 26 in the fore-edge image such that the user can recognize the position of the page having been displayed in the text display region 20 when the display mode was switched to the fore-edge display mode (hereinafter referred to as the "page being viewed" also). More specifically, the part of the fore-edge image corresponding to the portion from the top page to the page being viewed of the electronic book is designated as the read portion 24, and the part thereof corresponding to the portion from the page next to the page being viewed to the final page as the unread portion 26. And the read portion 24 is displayed in a different display mode, such as colored gray, from the unread portion 26.

Also, the fore-edge display control unit 62 associates the coordinates of relatively higher positions of the fore-edge image with the relatively earlier pages of the electronic book and the coordinates of relatively lower positions thereof with the relatively later pages thereof. In the embodiments of the invention, the association is such that "page corresponding to a specific Y coordinate in the fore-edge image"=[specific Y coordinate]÷[height of the fore-edge image]×[total number of pages of the book] (decimal places discarded). The specific Y coordinate represents a vertical position when the uppermost position of the fore-edge image is "1" and the lowermost position is a maximum value equal to the total number of pages. Also, the height of the fore-edge image is the maximum value of Y coordinate in the fore-edge image, for instance.

When a tapping on the fore-edge image is detected, the fore-edge display control unit 62 identifies the page corresponding to the tapped position and causes a display of a page guide 30 at the position of the fore-edge image corresponding to the page. At this time, the main information display control unit 60 identifies the page corresponding to the tapped position, acquires the content of the page from the book information storage 72, and causes a display of the acquired content thereof in the text display region 20. In this case, "number of page displayed in the text display region 20"=[Y coordinate of tapped position]÷[height of the fore-edge image]×[total number of pages of the book] (decimal places discarded).

When a tracing on the fore-edge image is detected, the fore-edge display control unit 62 identifies the page corresponding to the start position of tracing and then causes a display of the page guide 30 in the position of a fore-edge image corresponding to the thus identified page. Also, the fore-edge display control unit 62 sequentially identifies a plurality of pages corresponding up to the end position of tracing and then sequentially displays the page guide 30 at the position of a fore-edge image corresponding to each of the respective plurality of pages. In other words, when a trace operation on the fore-edge image is detected, the page guides 30 are sequentially displayed at the position of fore-edge images corresponding to the respective pages from the page corresponding to the start position of the trace operation to the page corresponding to the end position of the trace operation.

At this time, the main information display control unit 60 identifies a page corresponding to the start position of tracing, acquires the content of the thus identified page from the book information storage 72, and displays the acquired content thereof in the text display region 20. Also, a plurality of pages corresponding to the traced positions up to the end of the trace operation are sequentially identified by the main information display control unit 60. And the content of each page is displayed in the text display region 20 by sequentially switching the content of the respective pages by the main information display control unit 60. In other words, the content of a plurality of pages from the page corresponding to the start position of the trace operation to the page corresponding to the end position of the trace operation are sequentially switched so as to be displayed in the text display region 20.

More specifically, the pages related to the tracing are identified as follows and the content of those pages are sequentially switched and displayed.

1. "the page number at the start of tracing"=[Y coordinate indicating the initially touched position in the fore-edge image]÷[height of the fore-edge image]×[total number of pages of the book] (decimal places discarded).

2. "the page number during a tracing"=[Y coordinate indicating the touched position during the tracing]÷[height of the fore-edge image]×[total number of pages of the book] (decimal places discarded).

3. "the page number at the end of tracing"=[Y coordinate indicating the last touched position in the fore-edge image]÷[height of the fore-edge image]×[total number of pages of the book] (decimal places discarded).

After the tracing, the page according to the above #3 is displayed.

As described above, the Y coordinate in the fore-edge image is such that the uppermost position of the fore-edge image is set to "1" and such that the lower the fore-edge image is located, the value of Y coordinate in the fore-edge image will be larger. Thus, the longer the trace distance on the fore-edge image is, the greater number of pages the main information display control unit 60 will sequentially switch and display. If the user wishes to advance the increased number of pages, the longer tracing will be required and therefore the same operation as for reading books of paper medium is carried out. As the user traces downward on the fore-edge image, the main information display control unit 60 sequentially switches the pages from relatively (sequentially) earlier pages to relatively (sequentially) later pages of the electronic book and sequentially displays them. As, on the other hand, the user traces upward on the fore-edge image, the main information display control unit 60 sequentially switches the pages from relatively (sequentially) later pages to relatively (sequentially) earlier pages of the electronic book and sequentially displays them.

In the spine display mode, the spine display control unit 64 provides the spine display region 32 on the right side of the text display region 20 so that the spine display region 32 does not overlap the scaled-down text display region 20, and displays the spine image in the spine display region 32. The spine display control unit 64 adjusts the thickness of the entire spine image according to the total number of pages of the electronic book stored in the book information storage 72. In other words, the larger the total number of pages of the electronic book, the thicker the horizontal width of the spine image will be displayed.

While using as the key the ID of the electronic book being displayed in the text display region 20 by the main information display control unit 60, the spine display control unit 64 acquires from the book information storage 72 the title, volume number and author name. Then the spine image where the character strings indicating the title, volume number and author name have been set are displayed in the spine image.

In the top-edge display mode, the top-edge display control unit 66 provides the top-edge display region 34 on the upper side of the text display region 20 so that the top-edge display region 34 does not overlap the scaled-down text display region 20, and displays the top-edge image in the top-edge display region 34. The top-edge display control unit 66 adjusts the thickness of the entire top-edge image according to the total number of pages of the electronic book stored in the book information storage 72. In other words, the larger the total number of pages of the electronic book, the thicker the vertical width of the top-edge image will be displayed.

While using as the key the ID of the electronic book being displayed in the text display region 20 by the main information display control unit 60, the top-edge display control unit 66 acquires information on a bookmark, which has already been set to the electronic book, from the bookmark information storage 74. Here, the bookmark information includes the bookmark ID, the page number and coordinate information indicating the setting position of the bookmark, and the like. Then the top-edge display control unit 66 additionally displays the bookmark image indicating said page number at the position of the top-edge image indicated by said coordinate information.

If, a user's predetermined insertion operation of a bookmark to the top-edge image, typically a tracing or dragging, is detected, the top-edge display control unit 66 will acquire from the main information display control unit 60 the page number of a page being displayed in the text display region 20. Then the bookmark image indicating said page number is newly displayed by the top-edge display control unit 66 at the position of the top-edge image corresponding to the trace position detected by the operation detector 56. Further, the top-edge display control unit 66 assigns the bookmark ID and stores in the bookmark information storage 74 the ID of an electronic book to which the bookmark has been inserted (i.e., the electronic book being viewed), the bookmark ID, the page number, and the coordinate information indicating the position of the bookmark in the top-edge image by associating them with each other.

If, a user's predetermined selection operation of a bookmark on the top-edge image, typically a tapping on the bookmark image that has already been set in the top-edge image, is detected, the main information display control unit 60 will acquire from the top-edge display control unit 66 the page number that has been associated beforehand with the bookmark. In other words, this page number is the page number displayed through the bookmark selected by the user. The main information display control unit 60 acquires from the book information storage 72 the content of the page identified by the acquired page number and then displays the content thereof in the text display region 20.

An operation of the mobile information terminal 100 implementing the above-described structure is as follows.

Figure 13:
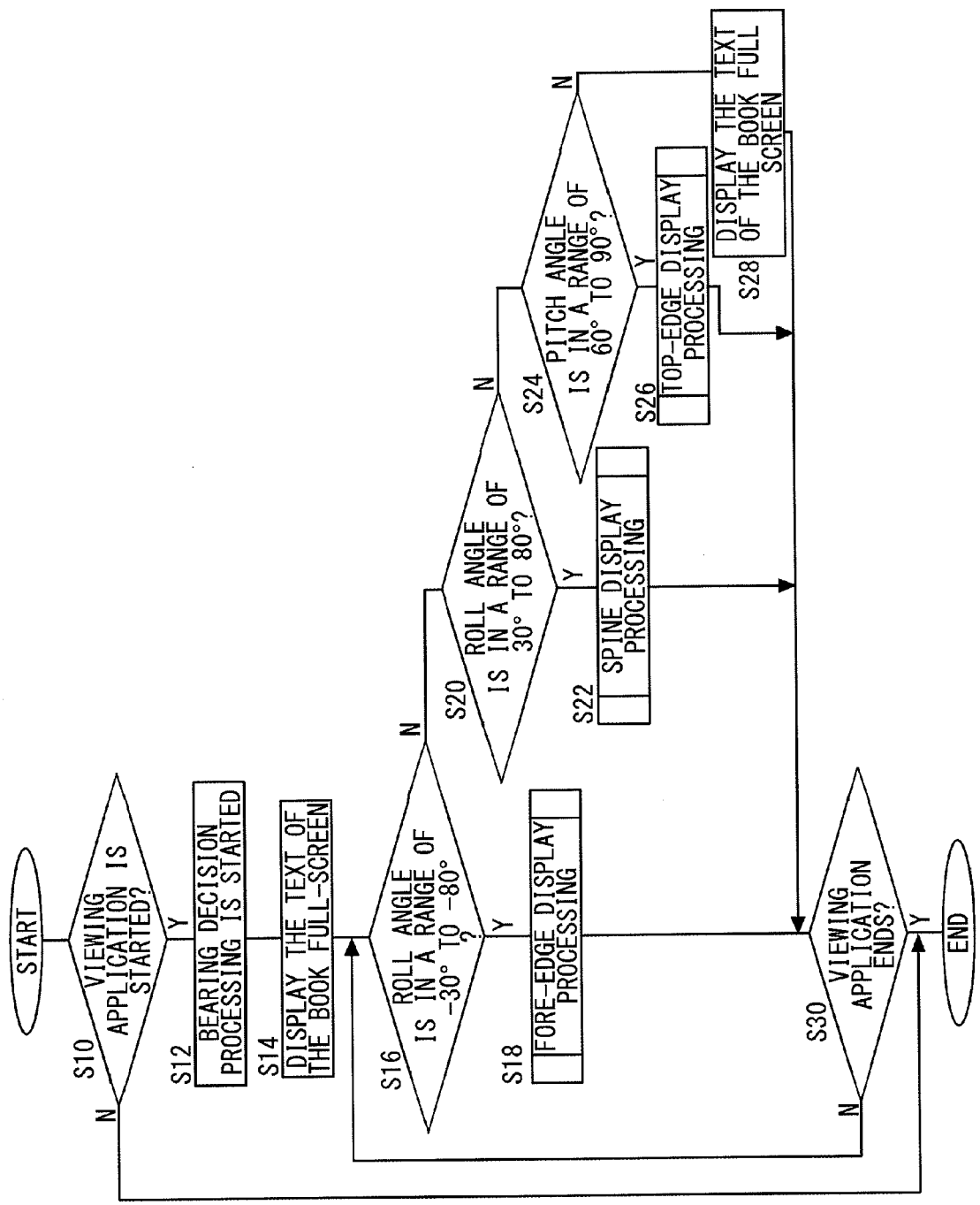
FIG. 13 is a flowchart showing an operation of a mobile information terminal.

FIG. 13 is a flowchart showing an operation of the mobile information terminal 100. If the digital book viewing application is not started in the mobile information terminal 100 (N of S10), the subsequent processes will be skipped and the flow of FIG. 13 will be terminated. If the digital book viewing application is started (Y of S10), the terminal bearing decision unit 52 starts to decide the bearing of the mobile information terminal 100. The main information display control unit 60 displays the text of a book specified by the user, namely the content of a specific page, on the entire display 10 (S14).

If the terminal bearing decision unit 52 determines that the roll angle is in the range of −30 to −80 degrees (Y of S16), the display mode determination unit 54 will decide that a switch to the fore-edge display mode be made and will therefore carry out the fore-edge display processing (described later) (S18). If the terminal bearing decision unit 52 determines that the roll angle is in the range of 30 to 80 degrees (N of S16 and Y of S20), the display mode determination unit 54 will decide that a switch to the spine display mode be made and will therefore carry out the spine display processing (described later) (S22). If the terminal bearing decision unit 52 determines that the pitch angle is in the range of 60 to 90 degrees (N of S20 and Y of S24), the display mode determination unit 54 will decide that a switch to the top-edge display mode be made and will carry out the top-edge display processing (described later) (S26). If the terminal bearing decision unit 52 determines that the bearing of the mobile information terminal 100 is not in the above positions, namely, the inclination of the mobile information terminal 100 lies outside the above ranges (N of S24), the display mode determination unit 54 will decide that a switch to the text display mode be made and will cause a full-screen display of the content of a specific page of the electronic book (S28). It should be noted here that the term "a switch to (some mode)" used here in this paragraph is a concept that includes one in which the display mode is switched to its own display mode, in other words, one in which the display mode is kept intact.

If the digital book viewing application is terminated by the user (Y of S30), the flow of FIG. 13 will be terminated. If the execution of the viewing application is to be continued (N of S30), the terminal bearing decision unit 52 will again decide the bearing of the mobile information terminal 100 and the process will return to Step S16. For example, if the bearing of the mobile information terminal 100 returns to the standard bearing after a switch has been made from the text display mode to the fore-edge display mode, the display mode will also return to the text display mode from the fore-edge display mode. If, on the other hand, the bearing of the mobile information terminal 100 keeps the condition of the fore-edge display mode, the fore-edge display mode will be kept.

Figure 14:
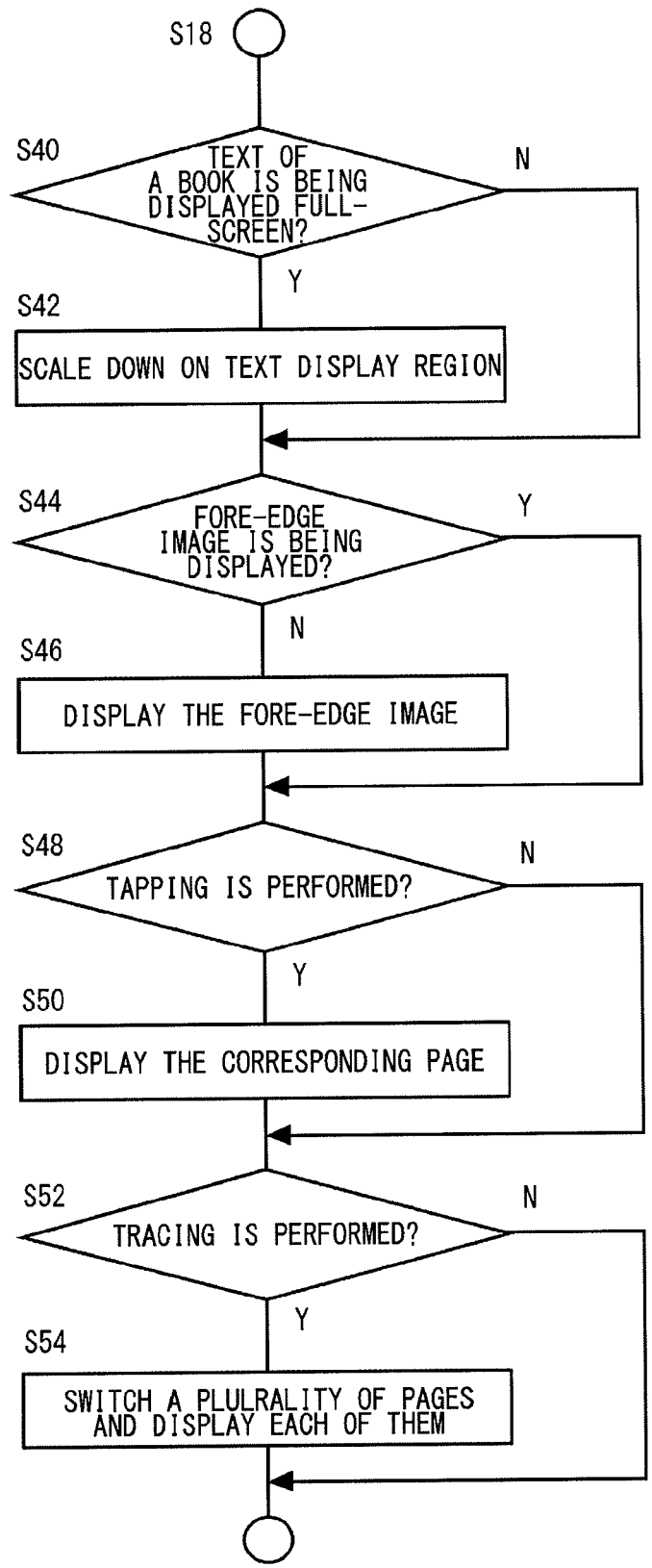
FIG. 14 is a flowchart showing a detailed fore-edge display processing of Step S18 of FIG. 13.

FIG. 14 is a flowchart showing a detailed fore-edge display processing of Step S18 of FIG. 13. If the main information display control unit 60 is displaying the text of the book on the entire display 10 (Y of S40), the main information display control unit 60 will make the text display region smaller in size (S42). If the text display region 20 has already been made smaller (N of S40), Step S42 will be skipped. If no fore-edge image is being displayed (N of S44), the fore-edge display control unit 62 will display a fore-edge image in the fore-edge display region 22 (S46). If a fore-edge image is already being displayed (Y of S44), Step S46 will be skipped.

As the operation detector 56 detects a tapping on a fore-edge image (Y of S48), the main information display control unit 60 will display on the text display region 20 the content of a page corresponding to the tapped position (S50). If the tapping is not detected (N of S48), Step S50 will be skipped. As the operation detector 56 detects a tracing on the fore-edge image (Y of S52), the main information display control unit 60 will sequentially identify (switch) the content of each of a plurality of pages specified by the tracing and then display the sequentially identified (switched) page on the text display region 20 (S54). If the tracing is not detected (N of S52), Step S54 will be skipped. Though not shown in FIG. 4, the fore-edge display control unit 62 causes of a display of the page guide 30, in the fore-edge image, that indicates the position of a page concerning the tap operation or trace operation in the whole book.

Figure 15:
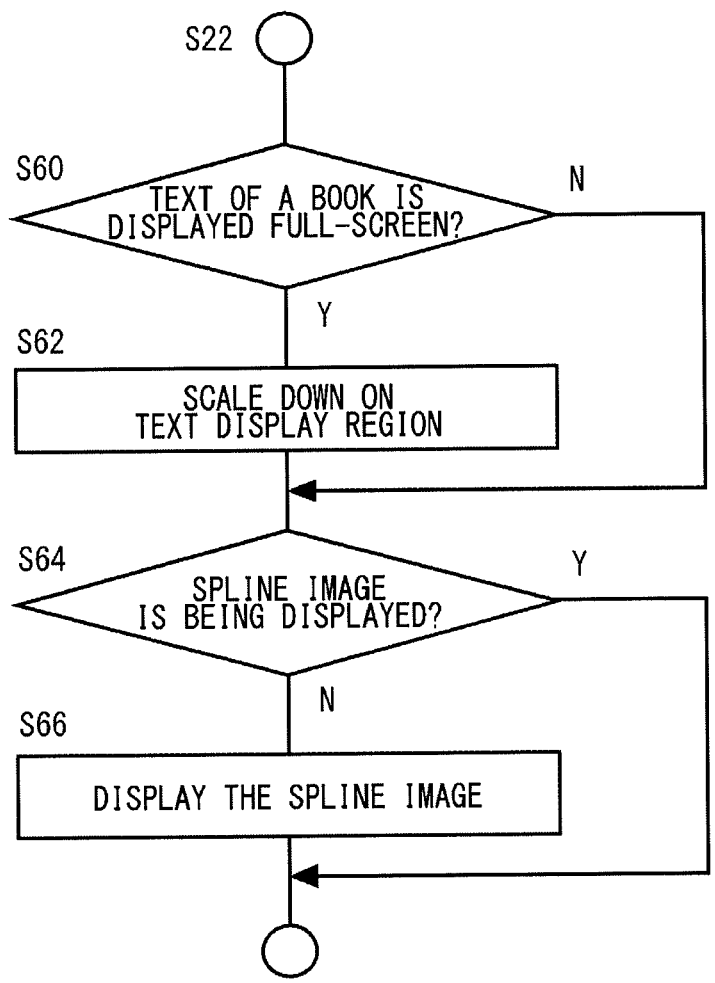
FIG. 15 is a flowchart showing a detailed spine display processing of Step S22 of FIG. 13.

FIG. 15 is a flowchart showing a detailed spine display processing of Step S22 of FIG. 13. If the main information display control unit 60 is displaying the text of the book on the entire display 10 (Y of S60), the main information display control unit 60 will make the text display region smaller in size (S62). If the text display region 20 has already been made smaller (N of S60), Step S62 will be skipped. If no spine image is being displayed (N of S64), the spine display control unit 64 will display a spine image in the spine display region 32 (S66). If a spine image is already being displayed (Y of S64), Step S66 will be skipped.

Figure 16:
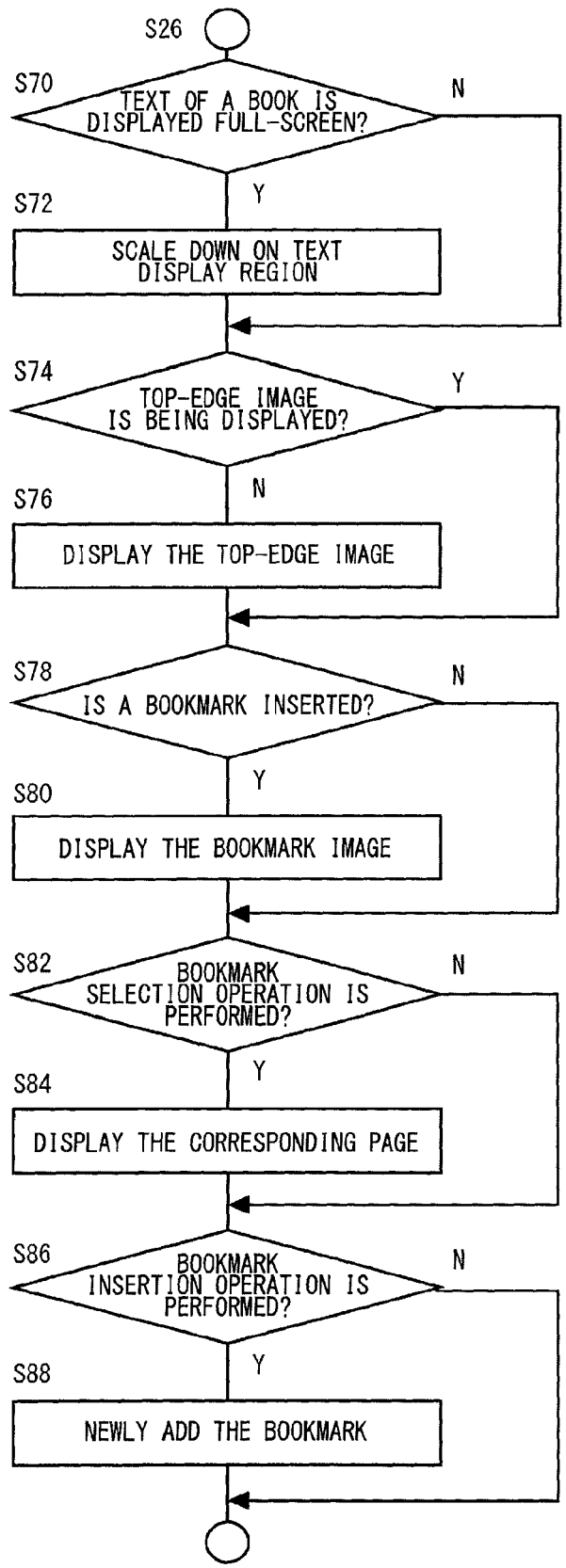
FIG. 16 is a flowchart showing a detailed top-edge display processing of Step S26 of FIG. 13.

FIG. 16 is a flowchart showing a detailed top-edge display processing of Step S26 of FIG. 13. If the main information display control unit 60 is displaying the text of the book on the entire display 10 (Y of S70), the main information display control unit 60 will make the text display region smaller in size (S72). If the text display region 20 has already been made smaller (N of S70), Step S72 will be skipped. If no top-edge image is being displayed (N of S74), the top-edge display control unit 66 will display a top-edge image in the top-edge display region 34 (S76). If a top-edge image is already being displayed (Y of S74), Step S76 will be skipped. If a bookmark has already been set to a e-book that the user is reading (Y of S78), the top-edge display control unit 66 will acquire the information on the bookmark, which has already been set thereto, from the bookmark information storage 74 and then additionally display a bookmark image in the top-edge image (S80). If no bookmark is set to the e-book that the user is reading (N of S78), Step S80 will be skipped.

As a user's operation to select the bookmark that has already been set in the top-edge image is detected (Y of S82), the main information display control unit 60 displays the content of a page corresponding to the bookmark, in the text display region 20 (S84). If no selection operation of the bookmark is detected (N of S82), Step S84 will be skipped. An operation to insert a new bookmark to the top-edge image is detected (Y of S86), the top-edge display control unit 66 will display a new bookmark image in the top-edge image and simultaneously store the newly-set bookmark information to the bookmark information storage 74 (S88). If no insertion of a new bookmark is detected (N of S86), Step S88 will be skipped.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention. Modifications will now be described below.

A description is now given of a first modification. In the above-described embodiments, each position in the vertical direction of a fore-edge image is associated with a specific page of the electronic book. In the first modification, each position in the horizontal direction thereof may be associated with the specific page of the electronic book. For example, the relatively rightward portions of the fore-edge image may be associated with the relatively earlier pages of the electronic book, and the relatively leftward portions of the fore-edge image with the relatively later pages thereof. Also, the association may be such that "page corresponding to a specific X coordinate in the fore-edge image"=[specific X coordinate]÷[width of the fore-edge image]×[total number of pages of the book] (decimal places discarded). The specific X coordinate represents a horizontal position when the top page position is "1" and the last page position is the maximum value. Also, the width of the fore-edge image is the maximum value of X coordinate in the fore-edge image, for instance.

In this first modification, with a right-to-left tracing on the fore-edge image, the main information display control unit 60 sequentially switches the pages from the relatively earlier pages to the relatively later pages in the electronic book and displays them, respectively. On the other hand, with a left-to-right tracing on the fore-edge image, the main information display control unit 60 sequentially switches the pages from the relatively later pages to the relatively earlier pages in the electronic book and displays them, respectively. The first modification can give the user a sense of familiarity in the reading of a digital book approximating the reading of a paper book, too.

A description is given of a second modification. In the above-described embodiments, each position in the vertical direction of a fore-edge image is associated with a specific page of the electronic book. In the second modification, each position of the fore-edge image and the specific page of the electronic book may not be associated with each other. In such a case, when a trace operation on the fore-edge image in a certain direction (e.g., up-to-down direction) is detected, the main information display control unit 60 may sequentially switch and display the pages from the relatively earlier pages to the relatively later pages in the electronic book, respectively, or may sequentially switch and display the pages from a page being currently viewed to the later pages than the currently viewed page. Also, when a trace operation on the fore-edge image in the opposite direction (e.g., down-to-up direction) is detected, the main information display control unit 60 may sequentially switch and display the pages from the relatively later pages to the relatively earlier pages in the electronic book, respectively, or may sequentially switch and display the pages from a page being currently viewed to the earlier pages than the currently viewed page.

In another modification according to the second modification, if a tracing on a fore-edge image is detected, the main information display control unit 60 may perform control such that the longer the trace distance on the fore-edge image is, the greater number of pages will be sequentially switched and displayed. For example, the trace distances may be categorized beforehand into a plurality of groups, and a group in which the trace distance is longer may be associated beforehand with a greater number of pages. If a tracing is detected, the main information display control unit 60 may identify a group associated with the trace distance and may sequentially switch and display the pages by the number of pages associated with the group from the currently viewed page. The pages may be switched to later pages than the currently viewed page or, conversely, may be switched to earlier pages than the currently viewed page.

A description is given of a third modification. In the above-described embodiments, the fore-edge display region 22 is set on the left side of the text display region 20, whereas the spine display region 32 is set on the right side of the text display region 20. In the third modification, the fore-edge display region 22 may be set on the right side of the text display region 20, and the spine display region 32 may be set on the left side of the text display region 20. In this case, the conditions for the switching mode will be opposite to those described in the embodiments.

If the position of a fore-edge position or the information indicating the binding position is acquired as attribute information on an electronic book, the fore-edge display region 22 may be provided in a direction indicated by the fore-edge position or in a direction opposite to the direction of the binding position. Then, the spine display region 32 may be provided in a direction opposite to the direction of the fore-edge position or in a direction indicated by the binding position.

Also, the display control unit 58 (and various functional blocks included in the display control unit 58) may determine the writing direction of text in an electronic book. If the text of the electronic book is in vertical writing mode, the fore-edge display region 22 may be set on the left side of the text display region 20, and the spine display region 32 may be set on the right side of the text display region 20. If, on the other hand, the text of the electronic book is in horizontal writing mode, the fore-edge display region 22 may be set on the right side of the text display region 20, and the spine display region 32 may be set on the left side of the text display region 20. If the content of an electronic book is written in a European language or the like (if, for example, the attribute information indicates that the electronic book is a book written in a European language), the fore-edge display region 22 may be set on the right side of the text display region 20, and the spine display region 32 may be set on the left side of the text display region 20. If the content of an electronic book is written in English (if, for example, the attribute information indicates that the electronic book is a book written in English), the fore-edge display region 22 may be set on the right side of the text display region 20, and the spine display region 32 may be set on the left side of the text display region 20.

Figure 17:
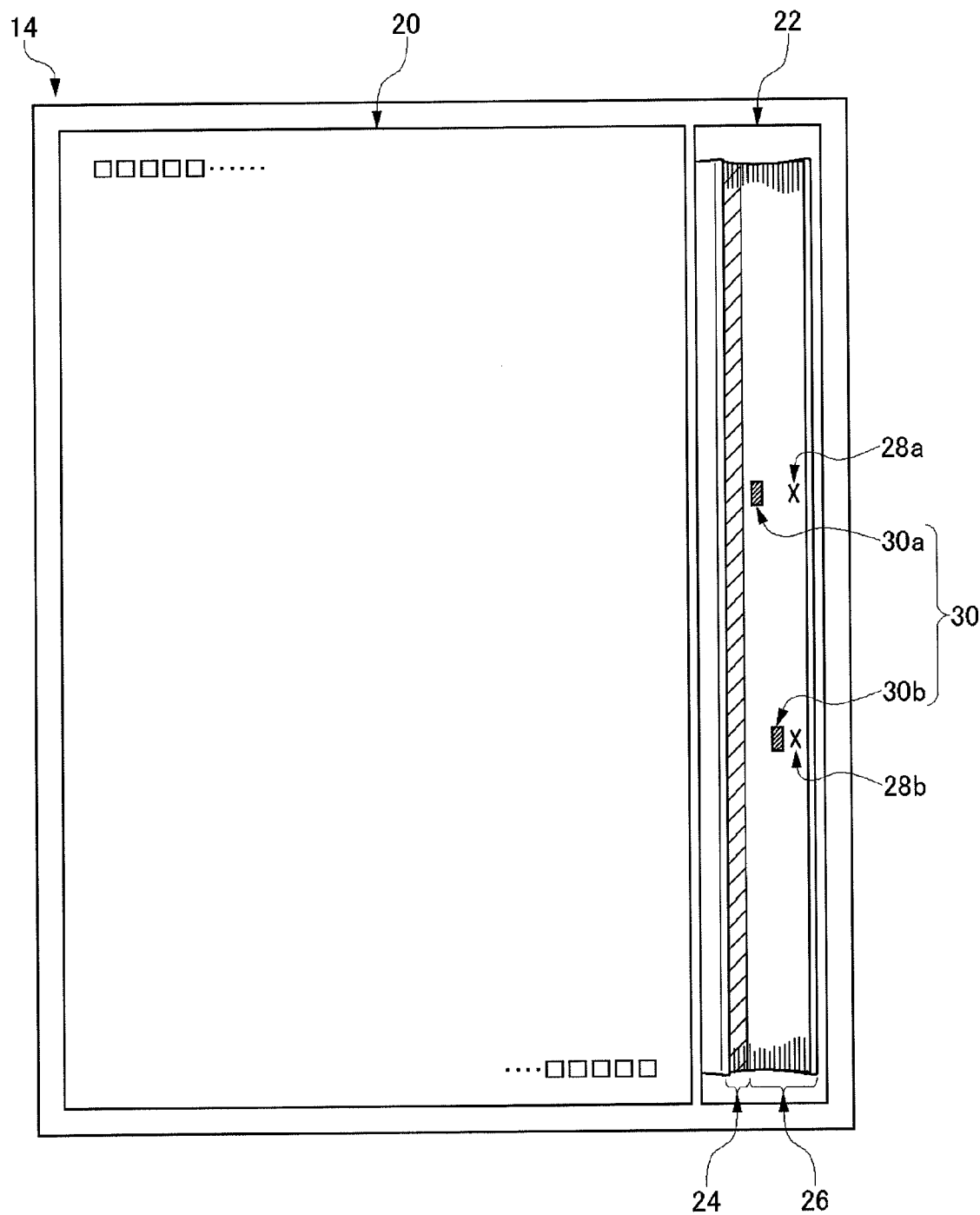
FIG. 17 shows a user interface in a fore-edge display mode according to a third modification.

FIG. 17 shows a user interface in a fore-edge display mode according to the third modification. FIG. 17 shows an example where the fore-edge display region 22 is provided on the right side of the text display region 20 where the content is in horizontal writing mode. FIG. 17 corresponds to FIG. 6, and the elements that are identical to or correspond to those of FIG. 6 are given the same reference numerals as those of FIG. 6. In this case, the read portion 24 lies left to the unread portion 26. Also, when a trace operation on the fore-edge display region 22 is done in the top-to-bottom vertical direction, the page guide 30 moves from left to right. In the third embodiment, as described in connection with FIG. 7, the mobile information terminal 100 goes into the fore-edge display mode when the roll angle enters the range of 30 to 80 degrees.

Figure 18:
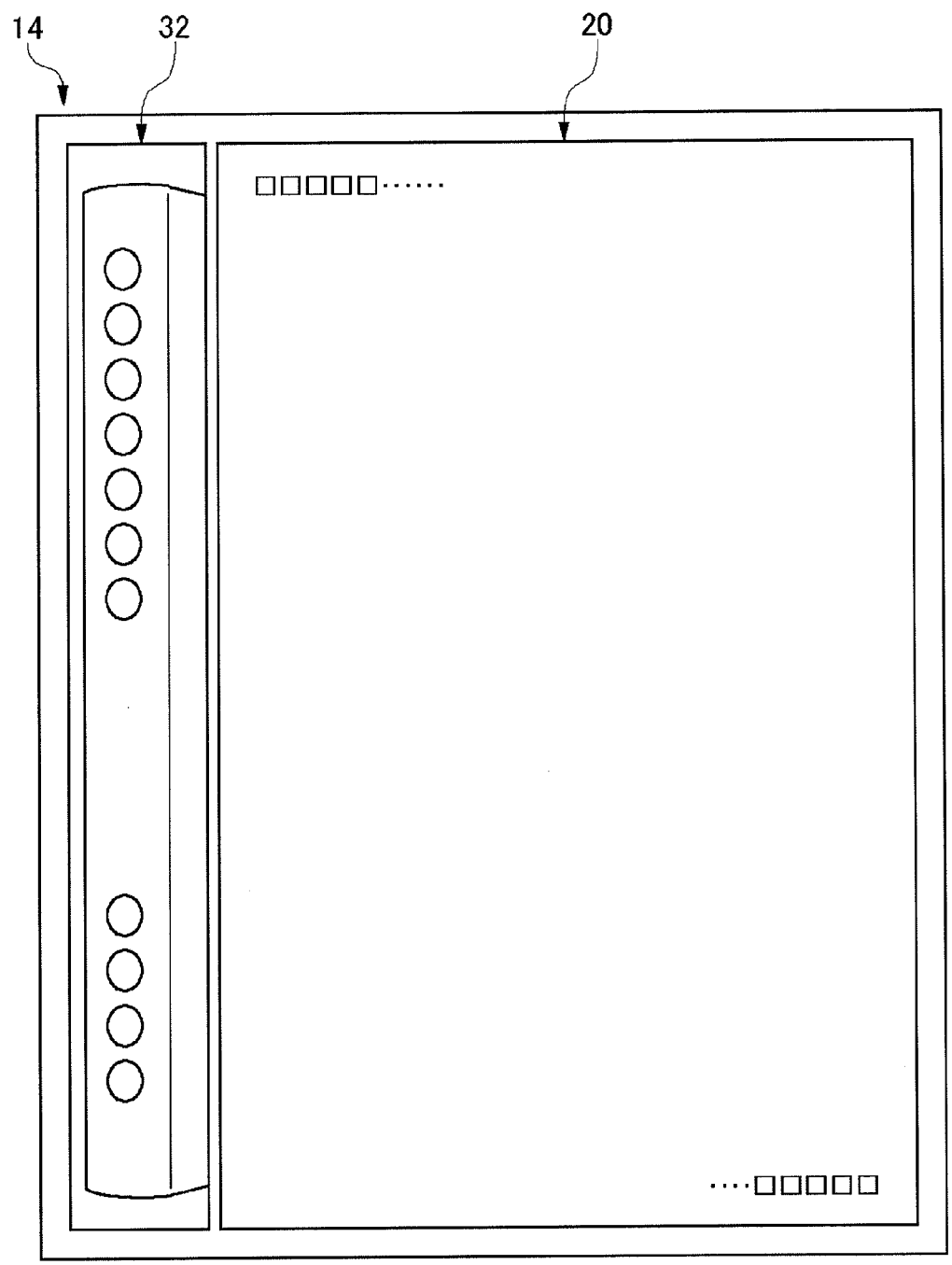
FIG. 18 shows a user interface in a spine display mode according to a third modification.

FIG. 18 shows a user interface in a spine display mode according to the third modification. FIG. 18 shows an example where the spine display region 32 is provided on the left side of the text display region 20 where the content is in horizontal writing mode. FIG. 18 corresponds to FIG. 8, and the elements that are identical to or correspond to those of FIG. 8 are given the same reference numerals as those of FIG. 8. In the third embodiment, as described in connection with FIG. 5, the mobile information terminal 100 goes into the spine display mode when the roll angle enters the range of −30 to −80 degrees.

A description is given of a fourth modification. In the above-described embodiments, when in the fore-edge display mode the bearing of the mobile information terminal 100 is other than the condition of the fore-edge display mode, the display mode is changed to another display mode. For example, the display mode is changed to the text display mode when the bearing of the mobile information terminal 100 is the standard bearing. In the fourth embodiment, during a tapping or tracing on a fore-edge image in the fore-edge display mode, namely while the contact of a user's finger on the fore-edge image is being detected, the display mode determination unit 54 may not change the display mode to another display mode even though the bearing of the mobile information terminal 100 is other than the condition of the fore-edge display mode. In other words, the fore-edge display mode may be kept unchanged. According to the fourth modification, even though the bearing of the mobile information terminal 100 has been changed unintentionally, namely against the user's intention, during an operation on the fore-edge image, the fore-edge display mode will be kept intact and therefore the user's convenience can be improved.

A description is given of a fifth modification. The mobile information terminal 100 according to the embodiments displays the content of an electronic book but the objects to be displayed thereon are not limited thereto. For example, the mobile information terminal 100 may display electronic content such as a plurality of photo images or a plurality of thumbnail image of moving images over a plurality of pages, and the method of displaying the electronic content suggested in the above-described embodiments may be applicable thereto.

The conditions set for the change of a display mode in the mobile information terminal 100 may be determined as appropriate based on the experience of developers or experiments or the like using the mobile information terminal 100. For example, threshold values other than those used in the above-described embodiments may also be used.

What is claimed is:

1. A mobile information apparatus comprising:
a main information display control unit, for a display of the mobile information apparatus, configured to display information described on a specific page of electronic content presented to a user over a plurality of pages;
a fore-edge display control unit configured to display an image of trimmed edges of a plurality of pages, as a fore-edge image, in a region different from the display of the information described on the specific page, when the mobile information terminal is tilted at a predetermined angle or more from a standard bearing;
an operation detector configured to detect a trace operation from the user on the fore-edge image,
wherein, when the trace operation is detected on the fore-edge image, the main information display control unit sequentially switches information described on a plurality of pages specified by the trace operation so as to be displayed,
wherein the electronic content electronic book, and
wherein, when the mobile information apparatus is tilted at the predetermined angle or more in a first direction of a portion of the electronic book as designated corresponding to a fore-edge of a paper book approaching the user, the fore-edge display control unit displays the fore-edge image; and
a spine display control unit configured to display an image indicating information concerning the electronic book, as a spine image, in a region different from the display region of the information described on the specific page, when the mobile information terminal is tilted at a predetermined angle or more in a second direction, opposite to the first direction, from a predetermined standard bearing.

2. The mobile information apparatus according to claim 1, wherein, when the trace operation on the fore-edge image is in a predetermined direction, the main information display control unit sequentially switches and displays information described on each page, from sequentially earlier pages to sequentially later pages.

3. The mobile information apparatus according to claim 1, wherein the main information display control unit displays information described on a page corresponding to a start position of the trace operation on the fore-edge image, and performs control such that the longer a trace distance on the fore-edge image is, the greater the number of pages sequentially switched and displayed.

4. The mobile information apparatus according to claim 1, wherein the main information display control unit sequentially switches and displays information described on each page, from a page corresponding to a start position of the trace operation on the fore-edge image to a page corresponding to an end position of the trace operation thereon.

5. The mobile information apparatus according to claim 1, wherein the predetermined angle is 60 degrees.

6. The mobile information apparatus according to claim 1, wherein, when the mobile information apparatus is tilted in a third direction perpendicular to the first or second direction, a portion of the electronic book as designated corresponding to a top-edge of a paper book approaching the user, the a top-edge image is displayed.

7. The mobile information apparatus according to claim 6, wherein, when the mobile information apparatus is tilted in a fourth direction opposite the third direction, a portion of the electronic book as designated corresponding to a top-edge of a paper book approaching the user, the a top-edge image is displayed.

8. A mobile information apparatus comprising:
a main information display control unit configured to display, on a display of the mobile information apparatus, information described on a specific page of electronic content presented to a user over a plurality of pages;
a fore-edge display control unit configured to display an image of trimmed edges of a plurality of pages, as a fore-edge image, in a region different from the display of the information described on the specific page, when the mobile information terminal is tilted at a predetermined angle or more from a standard bearing;
an operation detector configured to detect a tap operation from the user on the fore-edge image,
wherein, when the tap operation is detected at an arbitrary position of the fore-edge image, the main information display control unit displays information described on a page that is associated beforehand with the tap position,
wherein the electronic content is an electronic book, and
wherein, when the mobile information apparatus is tilted at the predetermined angle or more in a first direction of a portion of the electronic book as designated corresponding to a fore-edge of a paper book approaching the user, the fore-edge display control unit displays the fore-edge image; and
a spine display control unit configured to display an image indicating information concerning the electronic book, as a spine image, in a region different from the display region of the information described on the specific page, when the mobile information terminal is tilted at a predetermined angle or more in a second direction, opposite to the first direction, from a predetermined standard bearing.

9. A mobile information apparatus comprising:
a main information display control unit, for a display of the mobile information apparatus, configured to display information described on a specific page of electronic content presented to a user over a plurality of pages;
a fore-edge display control unit configured to display an image of trimmed edges of a plurality of pages, as a fore-edge image, in a region different from the display of the information described on the specific page, when the mobile information terminal is tilted at a predetermined angle or more from a standard bearing;
an operation detector configured to detect a trace operation from the user on the fore-edge image,
wherein, when the trace operation is detected on the fore-edge image, the main information display control unit sequentially switches and displays information described on each page, from sequentially earlier pages to sequentially later pages or in reverse,
wherein the electronic content is an electronic book, and
wherein, when the mobile information apparatus is tilted at the predetermined angle or more in a first direction of a portion of the electronic book as designated corresponding to a fore-edge of a paper book approaching the user, the fore-edge display control unit displays the fore-edge image; and
a spine display control unit configured to display an image indicating information concerning the electronic book, as a spine image, in a region different from the display region of the information described on the specific page, when the mobile information terminal is tilted at a predetermined angle or more in a second direction, opposite to the first direction, from a predetermined standard bearing.

10. A method for display electronic content, the method comprising:

displaying, on a display of a mobile information apparatus, information described on a specific page of electronic content presented to a user over a plurality of pages;

displaying an image of trimmed edges of a plurality of pages, as a fore-edge image, in a region different from the display of the information described on the specific page, when the mobile information terminal is tilted at a predetermined angle or more from a standard bearing;

detecting a trace operation from the user on the fore-edge image; and sequentially switching and displaying information described on a plurality of pages specified by the trace operation on the fore-edge image, wherein the electronic content is an electronic book, and wherein, when the mobile information apparatus is tilted at the predetermined angle or more in a first direction of a portion of the electronic book as designated corresponding to a fore-edge of a paper book approaching the user, the fore-edge display control unit displays the fore-edge image; and when the mobile information terminal is tilted at a predetermined angle or more in a second direction, opposite to the first direction, from a predetermined standard bearing, an image is displayed indicating information concerning the electronic book, as a spine image, in a region different from the splay region of the information described on the specific page.

11. A program, embedded in a non-transitory computer-readable medium, executable by a mobile information terminal, the program comprising:

a main information display module operative to display, on a display of a mobile information apparatus, information described on a specific page of electronic content presented to a user over a plurality of pages;

a fore-edge display control module operative to display an image of trimmed edges of a plurality of pages, as a fore-edge image, in a region different from the display of the information described on the specific page, when the mobile information terminal is tilted at a predetermined angle or more from a standard bearing; and an operation detection module operative to detect a trace operation from the user on the fore-edge image, wherein, when the trace operation is detected on the fore-edge image, the main information display control module sequentially switches information described on a plurality of pages specified by the trace operation so as to be displayed, wherein the electronic content is an electronic book, and wherein, when the mobile information apparatus is tilted at the predetermined angle or more in a first direction of a portion of the electronic book as designated corresponding to a fore-edge of a paper book approaching the user, the fore-edge display control module displays the fore-edge image; and a spine display control module configured to display an image indicating information concerning the electronic book, as a spine image, in a region different from the display region of the information described on the specific page, when the mobile information terminal is tilted at a predetermined angle or more in a second direction, opposite to the first direction, from a predetermined standard bearing.

* * * * *